US009866625B2

(12) United States Patent
Onishi

(10) Patent No.: US 9,866,625 B2
(45) Date of Patent: Jan. 9, 2018

(54) MESSAGE TRANSMISSION APPARATUS, MESSAGE TRANSMISSION METHOD, AND MESSAGE TRANSMISSION PROGRAM

(71) Applicant: NEC Corporation, Minato-ku, Tokyo (JP)

(72) Inventor: Takeo Onishi, Tokyo (JP)

(73) Assignee: NEC CORPORATION, Tokyo (JP)

(*) Notice: Subject to any disclaimer, the term of this patent is extended or adjusted under 35 U.S.C. 154(b) by 176 days.

(21) Appl. No.: 14/764,044

(22) PCT Filed: Jan. 21, 2014

(86) PCT No.: PCT/JP2014/051053
§ 371 (c)(1),
(2) Date: Jul. 28, 2015

(87) PCT Pub. No.: WO2014/122981
PCT Pub. Date: Aug. 14, 2014

(65) Prior Publication Data
US 2015/0365471 A1 Dec. 17, 2015

(30) Foreign Application Priority Data
Feb. 7, 2013 (JP) .................................. 2013-022389

(51) Int. Cl.
G06F 15/16 (2006.01)
H04L 29/08 (2006.01)
H04L 12/58 (2006.01)

(52) U.S. Cl.
CPC .............. *H04L 67/10* (2013.01); *H04L 51/24* (2013.01); *H04L 67/26* (2013.01)

(58) Field of Classification Search
CPC .... Y02B 60/50; H04W 76/048; H04W 24/10; H04W 36/0083; H04W 76/028
See application file for complete search history.

(56) References Cited

U.S. PATENT DOCUMENTS

2011/0110327 A1* 5/2011 Ramachandran ..... H04W 8/205
370/331
2011/0151876 A1* 6/2011 Ishii ................. H04W 36/0088
455/437

(Continued)

FOREIGN PATENT DOCUMENTS

CN 102301758 A 12/2011
CN 102870145 A 1/2013

(Continued)

OTHER PUBLICATIONS

International Search Report for PCT Application No. PCT/JP2014/051053, dated Apr. 22, 2014.

(Continued)

*Primary Examiner* — Peling Shaw

(57) ABSTRACT

Message transmission device, which performs processing concerning the transmission of messages to the terminal, executes notification processing for the transmission of a trigger packet to the terminal, said trigger packet indicating that an unsent message exists. Preparatory processing for transmission of the message to the terminal is executed. The order in which the notification processing and the preparatory processing is executed is determined in such a manner that the preparatory processing has been completed before a message acquisition request, which is a response for the trigger packet, is received from the terminal.

16 Claims, 13 Drawing Sheets

(56) References Cited

U.S. PATENT DOCUMENTS

| | | | |
|---|---|---|---|
| 2011/0269463 A1* | 11/2011 | Wang | H04W 76/046 455/436 |
| 2012/0020290 A1 | 1/2012 | Kanauchi et al. | |
| 2014/0051485 A1* | 2/2014 | Wang | H04B 7/2656 455/574 |
| 2014/0155061 A1* | 6/2014 | Kherani | H04W 48/16 455/434 |
| 2014/0173614 A1* | 6/2014 | Konik | G06F 9/4881 718/104 |
| 2015/0120854 A1* | 4/2015 | Bhat | H04L 67/322 709/207 |
| 2016/0119972 A1* | 4/2016 | Suzuki | H04W 76/02 455/500 |

FOREIGN PATENT DOCUMENTS

| | | |
|---|---|---|
| JP | H09-84087 A | 3/1997 |
| JP | 2002-366365 A | 12/2002 |
| JP | 2012-230555 A | 11/2012 |
| WO | 2011/137128 A1 | 11/2011 |

OTHER PUBLICATIONS

English translation of Written opinion for PCT Application No. PCT/JP2014/051053.

3GPP TS25.331: 3rd Generation Partnership Project; Technical Specification Group Radio Access Network; Radio Resource Control (RRC); Protocol specification(Release 10), V10.10.0, Dec. 2012.

3GPP TS36.331: 3rd Generation Partnership Project; Technical Specification Group Radio Access Network; Evolved Universal Terrestrial Radio Access (E-UTRA); Radio Resource Control (RRC); Protocol specification(Release 10), V10.8.0, Dec. 2012.

Chinese Office Action for CN Application No. 201480007975.5 dated Apr. 28, 2017 with English Translation.

* cited by examiner

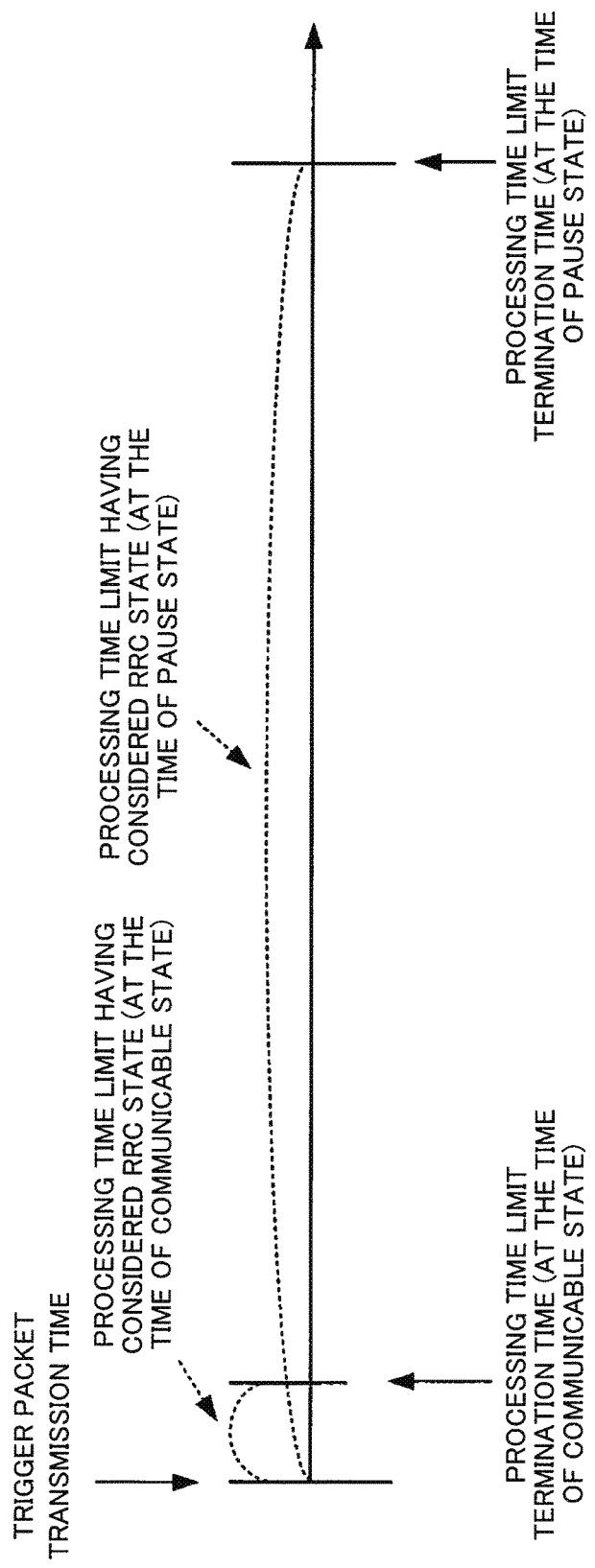

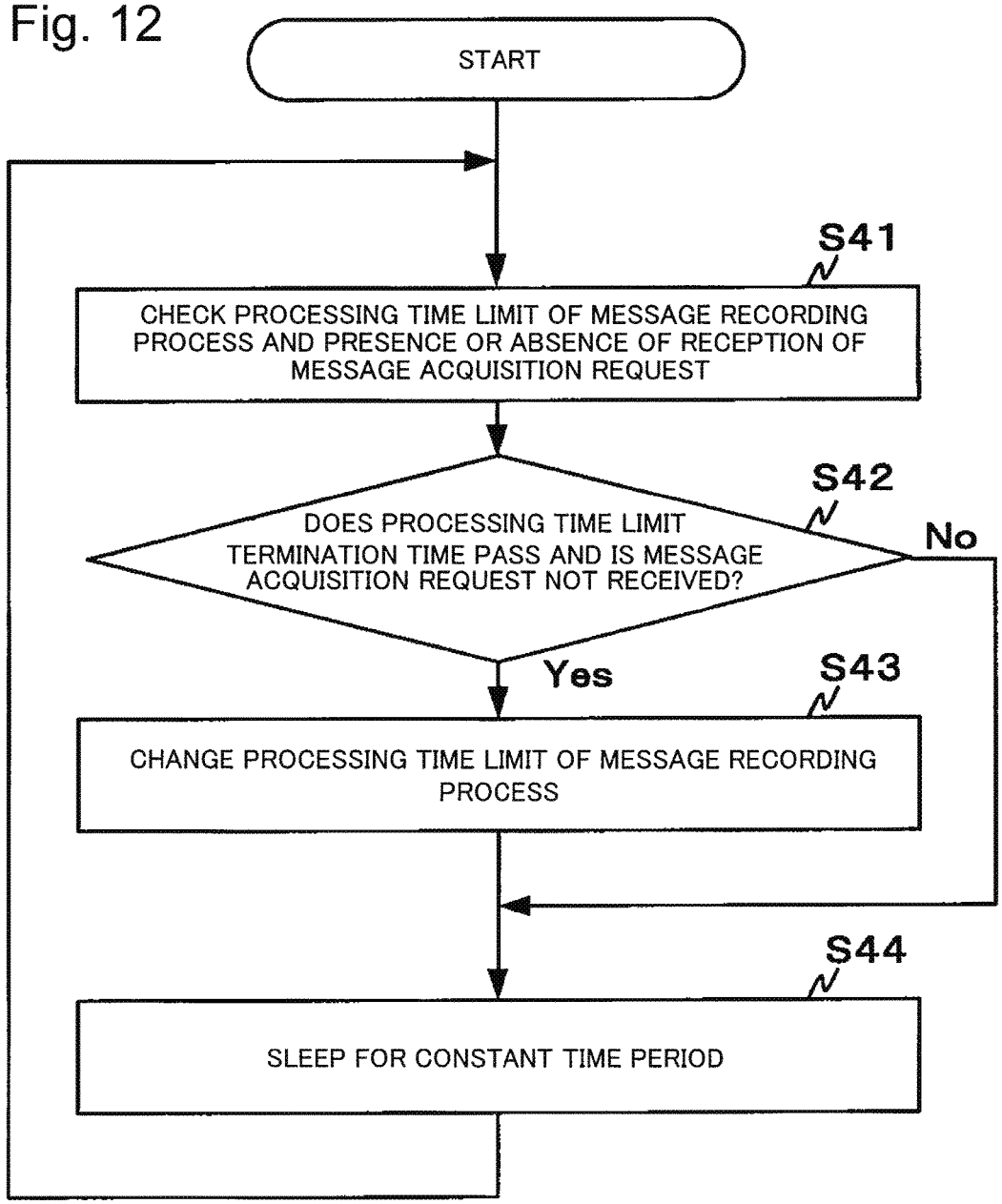

MESSAGE TRANSMISSION APPARATUS, MESSAGE TRANSMISSION METHOD, AND MESSAGE TRANSMISSION PROGRAM

This application is a National Stage Entry of PCT/JP2014/051053 filed on Jan. 21, 2014, which claims priority from Japanese Patent Application 2013-022389 filed on Feb. 7, 2013, the contents of all of which are incorporated herein by reference, in their entirety.

TECHNICAL FIELD

The present invention relates to a message transmission apparatus, a message transmission method, and a message transmission program for the purpose of message transmission.

BACKGROUND ART

At the present time, a push type event notification service, which is called push notification or a message (also called a push message), has been widely used.

At this point, in WWW (World Wide Web) used in the Internet, pull-type communication allows a WWW server on the Internet to start communication (mainly, download) to an information processing terminal by a trigger from the information processing terminal, and the pull-type communication is exclusively used. On the other hand, the push notification is different in that it starts communication (mainly, download) for the information processing terminal by a trigger of a service server side of a service provider on the Internet.

The push notification is generally used in any communication from a server apparatus to the information processing terminal. The detailed use, for example, includes incoming communication in a voice communication service conforming to VoIP (Voice over Internet Protocol), update communication of SNS (Social Networking Service), and the like. In the push notification, an event is actively notified from the server apparatus to the information processing terminal through a network conforming to IP (Internet Protocol).

A server apparatus (hereinafter, referred to as a "push server") transmitting a message receives a communication request of the incoming communication in the voice communication service conforming to the VoIP, the update communication of the SNS, chat message distribution, update communication of a cloud storage and the like from a service provider server (hereinafter, simply referred to as an "app server"). Herein, the app server is a server apparatus used by a service provider, which provides a service, such as an SNS manager.

The service provider provides in advance an application (hereinafter, simply referred to as an "app") for using the service to a user. The user installs the app in an information processing terminal such as a cellular phone and a personal computer used by the user. The user operates the app provided from the service provider on the information processing terminal.

On the other hand, the service provider requests the push server to transmit a message, which is addressed to the app provided by the service provider, by using the app server. The push server transmits a message to software (hereinafter, referred to as a "push client"), which operates on an information processing terminal, according to the message transmission request. The push client hands over the received message to a destination app. The app performs a process corresponding to the content of the message received from the push client.

A description will be continued with reference to a sequence diagram of FIG. 1. FIG. 1 is a sequence diagram for explaining the flow of a procedure in an event notification service.

Referring to FIG. 1, the present explanation example includes an information processing terminal 1000, a push server 1100, a message database 1200, and an app server 1300. Furthermore, the information processing terminal 1000 includes an app 1001 and a push client 1002.

Firstly, a message transmission request to the app 1001 is performed for the push server 1100 by the app server 1300 (step S1401).

The push server 1100 records a message in the message database 1200 (step S1402). Thereafter, the push server 1100 transmits a trigger packet indicating the presence of an untransmitted message to the push client 1002 of the information processing terminal 1000 serving as a destination of the message (step S1403).

The push client 1002 having received the trigger packet transmits a message acquisition request to the push server 1100 (step S1404).

The push server 1100 having received the message acquisition request acquires the message addressed to the information processing terminal 1000 from the message database 1200 (step S1405). Furthermore, the push server 1100 transmits the message to the push client 1002 as a response to the message acquisition request (step S1406).

The push client 1002 hands over the received message to the app 1001 (step S1407). The transmission of the message to the app 1001 is ended by such a procedure.

Such a scheme, in which after transmission preparation of data for a terminal in the push server is completed, the push server transmits a trigger to the terminal and the terminal having received the trigger acquires data from the push server, is disclosed in Patent Document 1 for example.

Furthermore, another example of such a push server includes a technology disclosed in Patent Document 2. The object of the technology disclosed in Patent Document 2 is to safely manage an identifier applied to a portable terminal in an information distribution system using a push notification service. The technology disclosed in Patent Document 2 prevents the leakage and the like of the identifier applied to the portable terminal by performing encryption communication in communication between a push server and a Web server included in the information distribution system.

CITATION LIST

Patent Document

[Patent Document 1] Japanese Unexamined Publication No. 2002-366365
[Patent Document 2] Japanese Unexamined Publication No. 2012-230555

Non Patent Document

[Non Patent Literature 1]: 3GPP TS25.331: Radio Resource Control (RRC); Protocol specification, [online], [retrieved on Jan. 30, 2013], Internet
http://www.3gpp.org/ftp/Specs/archive/25_series/25.331/
[Non Patent Literature 2]: 3GPP TS36.331: Evolved Universal Terrestrial Radio Access (E-UTRA); Radio Resource Control (RRC); Protocol specification, [online], [retrieved on Jan. 30, 2013], Internet <http://www.3gpp.org/ftp/Specs/archive/36_series/36.331/>

SUMMARY OF INVENTION

Technical Problem

While the aforementioned each technology is used, it is possible for active message to be transmitted from a push server side. But, the scheme, in which the transmission preparation of a message to be transmitted to the information processing terminal is completed and then the push server transmits a trigger, has a problem. The problem is that when a message transmission request addressed to a plurality of information processing terminal has been requested for the push server, delay until a push message reaches the terminal becomes large.

Herein, various composite factors cause the delay. In detail, as factors of the delay when the information processing terminal transmits a message, there are two of delay regarding communication between the push server and the terminal, and delay regarding a process in the push server.

Firstly, the delay regarding communication of the former will be described. The communication between the push server and the information processing terminal is performed using a radio communication network conforming to standards such as W-CDMA (Wideband Code Division Multiple Access), LTE (Long Term Evolution), and HSPA (High Speed Packet Access).

In these standards, power consumption is suppressed by control for setting an RRC (Radio Resource Control) state according to a communication situation. In detail, when an information processing terminal has not been performed to communicate during a constant period, the control is performed for the terminal to switch the RRC state from a communicable state (for example, a DCH state) to a pause state (for example, an IDLE state).

The communication delay occurring at the time of communication between the push server and the information processing terminal largely differs according to the RRC state of the information processing terminal.

For example, while communication delay until a packet reaches a terminal in a DCH state in WCDMA or in a CONN state in LTE is typically about several hundreds of milliseconds. The communication delay until a packet reaches a terminal in an IDLE state in WCDMA and LTE is about several seconds.

In addition, a mechanism regarding the type of the RRC state in these LTE, W-CDMA, and HSPA and the transition of the RRC state is stipulated by 3GPP (Third Generation Partnership Project) established by a standardization body of communication standards. The transition and the like of the RRC state are written in detail in Non-Patent Literature 1 and Non-Patent Literature 2. Furthermore, since these are also well-known to those skilled in the art, a detailed description thereof will be omitted.

Next, the delay regarding the process in the push server of the latter will be described.

In the push server, the message transmission process is sequentially performed. For a smooth process, a plurality of server apparatuses cooperates with each other.

However, in case of requesting a message transmission request addressed to a plurality of information processing terminals and exceeding the processing capability of the push server, a process for message transmission addressed to a certain information processing terminal is kept waiting by a process for message transmission addressed to another information processing terminal. In this way, delay occurs in the process in the push server. In addition, the delay of the process in the push server may be approximately the same as or may be equal to or more than the aforementioned communication delay.

Herein, it is particularly necessary to quickly perform the transmission process of the trigger packet during the process for the message transmission. This is because the information processing terminal does not transmit the message acquisition request to the push server as long as the trigger packet is not received. As the transmission process of the trigger packet is delayed, arrival of a message is also delayed.

In this regard, it is considered that the transmission process of the trigger packet is firstly performed in the process for the message transmission and is performed with a high priority as compared with another process. In this way, the transmission time of the trigger packet is advanced. Therefore, it is expected that the delay generated from the time when the push server 1100 receives a message transmission request to the time a message reaches the information processing terminal, becomes small.

However, the push server is not able to transmit a message to the information processing terminal immediately after the message acquisition request is received from the information processing terminal unless the push server completes another process required for the message transmission until the message acquisition request is received from the information processing terminal. The other process required for the message transmission, for example, is a recording process of a message to a message database. The push server waits for the completion of the other process required for the message transmission and then transmits a message. As a consequence, delay until the message reaches the terminal becomes large. For example, there is a case in which when a plurality of message transmission requests are received, a load above a constant level is applied to the push server. At this time, it is not possible to complete the other process required for the message transmission until the message acquisition request is received from the information processing terminal.

In this regard, an object of the present invention is to provide a message transmission apparatus, a message transmission method, and a message transmission program, by which it is possible to prevent an increase in delay generated from the time when a push server receives a message transmission request to the time the push server transmits a push message to a terminal even though a load is applied to the push server.

Solution to Problem

According to a first aspect of the present invention, a message transmission apparatus that performs a process regarding message transmission to a terminal includes: a notification means configured to perform a notification process for transmitting a trigger packet indicating presence of the message not transmitted to the terminal; a preparation means configured to perform a preparation process for transmitting the message to the terminal; and an order decision means configured to decide an execution order of the notification process and the preparation process such that the preparation process is ended before a message acquisition request is received from the terminal as a response for the trigger packet.

According to a second aspect of the present invention, a message transmission method that performs a process regarding message transmission to a terminal includes the steps of: performing a notification process for transmitting a trigger packet indicating presence of the message not transmitted to the terminal, performing a preparation process for transmitting the message to the terminal; and deciding an execution order of the notification process and the preparation process such that the preparation process is ended before a message acquisition request is received from the terminal as a response for the trigger packet.

According to a third aspect of the present invention, a message transmission program causing a computer to serve as a message transmission apparatus performing a process regarding message transmission to a terminal and including a notification means configured to perform a notification process for transmitting a trigger packet indicating presence of the message not transmitted to the terminal; a preparation means configured to perform a preparation process for transmitting the message to the terminal; and an order decision means configured to decide an execution order of the notification process and the preparation process such that the preparation process is ended before a message acquisition request is received from the terminal as a response for the trigger packet.

Advantageous Effects of Invention

According to the present invention, for example, even though a load is applied to a push server, it is possible to prevent an increase in the delay generated from the time when the push server receives a message transmission request to the time the push server transmits a push message to a terminal.

BRIEF DESCRIPTION OF DRAWINGS

FIG. 4-1 is a conceptual diagram for explaining the calculation of a processing time limit in each exemplary embodiment of the present invention.

FIG. 4-2 is a graph illustrating an example of a relation between a processing time limit and a priority of a message recording process in each exemplary embodiment of the present invention.

FIG. 12 is a flowchart illustrating an operation example in the exemplary embodiment 3 of the present invention.

DESCRIPTION OF EMBODIMENTS

Exemplary Embodiment 1

Next, an exemplary embodiment 1 of the present invention will be described in detail with reference to the drawings.

Figure 2:
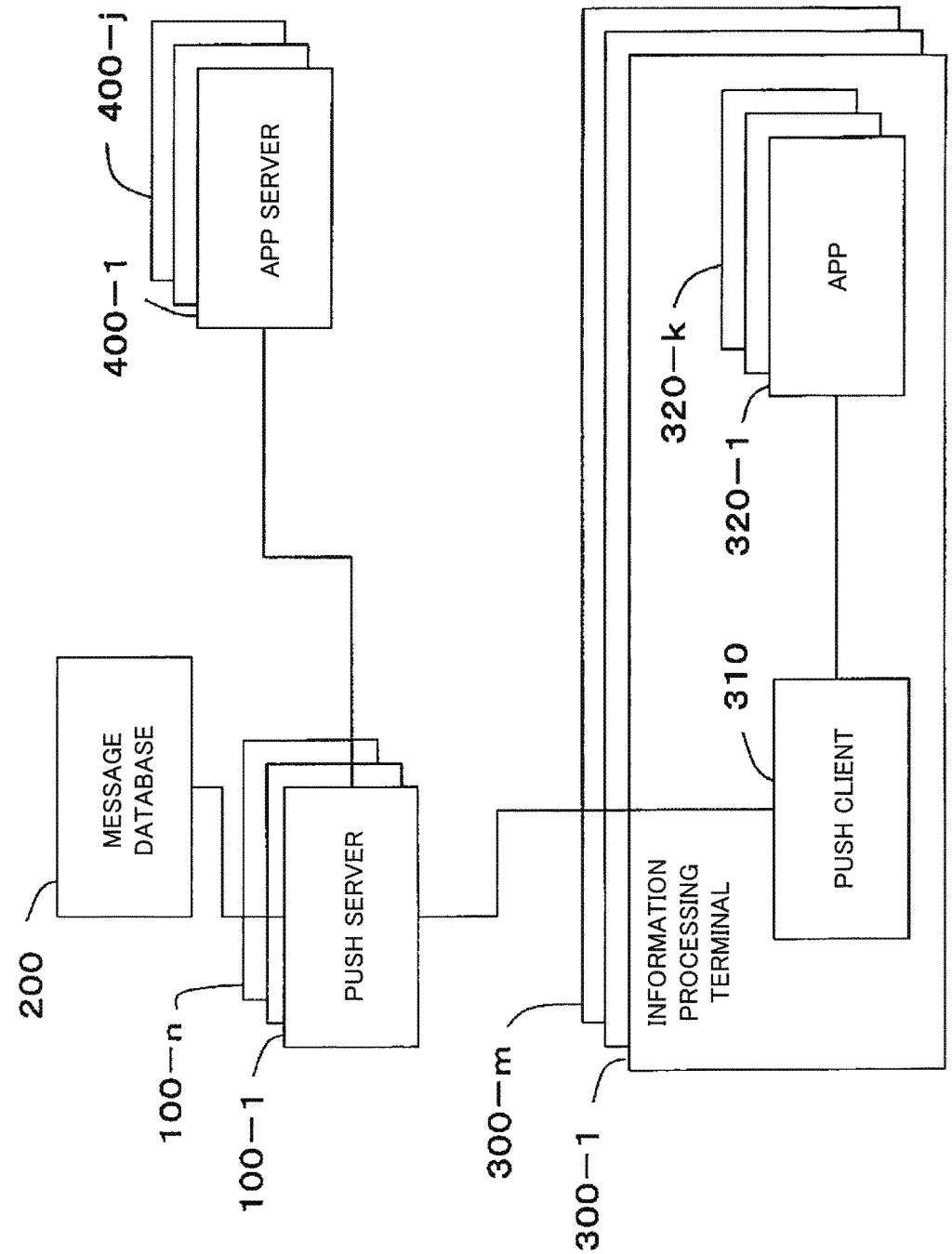
FIG. 2 is a block diagram illustrating a configuration example of a system in an exemplary embodiment 1 of the present invention.

FIG. 2 is a block diagram illustrating a system configuration of the exemplary embodiment 1. Referring to FIG. 2, a system according to the exemplary embodiment 1 includes push servers 100-1 to 100-$n$, a message database 200, information processing terminals 300-1 to 300-$m$, and app servers 400-1 to 400-$j$. Herein, each of "m", "n", and "j" of the end of the reference numerals is an integer equal to or more than 1. That is, there is no special limitation in the number of push servers 100, the number of information processing terminals 300, and the number of app servers 400.

Furthermore, the push servers 100-1 to 100-$n$ and the respective information processing terminals 300-1 to 300-$m$ are connected to each other by a radio communication network (not illustrated). The radio communication network is realized in accordance with a radio communication scheme in which switching of an RRC state is possible. Herein, the radio communication scheme in which switching of an RRC state is possible, for example, is a radio scheme such as LTE, W-CDMA, and HSPA described in Technical Problem.

In addition, in the following description, for example, a state, in which communication delay until a packet reaches the information processing terminal 300 from the push server 100 is typically about several hundreds of milliseconds such as a DCH state in WCDMA or a CONN state in LTE, is called a "communicable state". On the other hand, a state, in which communication delay until a packet reaches the information processing terminal 300 from the push server 100 is typically about several seconds such as an IDLE state in WCDMA and LTE, is called a "pause state".

On the other hand, the push servers 100-1 to 100-$n$ and the app servers 400-1 to 400-$j$, and the push servers 100-1 to 100-$n$ and the message database 200 are respectively connected to each other in the communicable state via a network (not illustrated) regardless of wired or wireless. The network can be realized in accordance with an arbitrary scheme, and may also be realized by a dedicated line or may also use a public network such as the Internet.

The push servers 100-1 to 100-$n$ receive a message transmission request to the information processing terminal 300 from the app server 400, and perform a message transmission process to the information processing terminal 300 serving as a destination. Functions of the push servers 100 may also be realized by one push server 100. However, in the exemplary embodiment 1, it is assumed that a load of the message transmission process is distributed by cooperation of a plurality of push servers 100-1 to 100-$n$. It is assumed that communication to the push server 100 from the information processing terminal 300 and the app server 400, for example, is allocated to any one of the push servers 100-1 to 100-*n* by a load balancer (a load distribution apparatus) and the like, and a load of each push server 100 is equalized as much as possible.

The message database 200 records messages which are transmitted to the information processing terminals 300-1 to 300-*m* from the push servers 100-1 to 100-*n*. The message database 200 is connected to the push servers 100-1 to 100-*n* so as to be communicable, so that it is possible to perform recording (writing) and referring (reading) of a message with respect to the message database 200 from arbitrary push servers 100-1 to 100-*n*. The message database 200, for example, is considered to be realized with RDB (Relational Data Base), but may also be realized by another data storage scheme such as KVS (Key Value Store).

The information processing terminals 300-1 to 300-*m* receive messages from the app servers 400-1 to 400-*j* via the push servers 100-1 to 100-*n*. The information processing terminals 300-1 to 300-*m*, for example, are cellular phones, tablet terminals, personal computers, digital signage terminals and the like.

Furthermore, each of the information processing terminals 300-1 to 300-*m* includes a push client 310 and apps 320-1 to 320-*k* (k is an integer equal to or more than 1).

The push client 310 receives messages from the push servers 100-1 to 100-*n*, and transmits the messages to the apps 320-1 to 320-*k* designated as a destination. The apps 320-1 to 320-*k*, for example, are apps provided by a service provider.

The app servers 400-1 to 400-*j*, for example, are servers used when a service provider provides a service. The app servers 400-1 to 400-*j* transmit message acquisition requests for the apps 320-1 to 320-*k* operating on the information processing terminals 300-1 to 300-*m* to the push servers 100-1 to 100-*n*.

Each server such as the push server 100 and the app server 400 may also be realized by a separate server apparatus, but functions of a plurality of servers may also be realized by one server apparatus. Furthermore, functions of one server may also be realized by cooperation of a plurality of server apparatuses. Furthermore, the message database 200 may also be physically embedded in the push servers 100.

Subsequently, a description will be given with reference to FIG. 3 which is a block diagram illustrating a functional block of the push server 100 in the exemplary embodiment 1.

Figure 3:
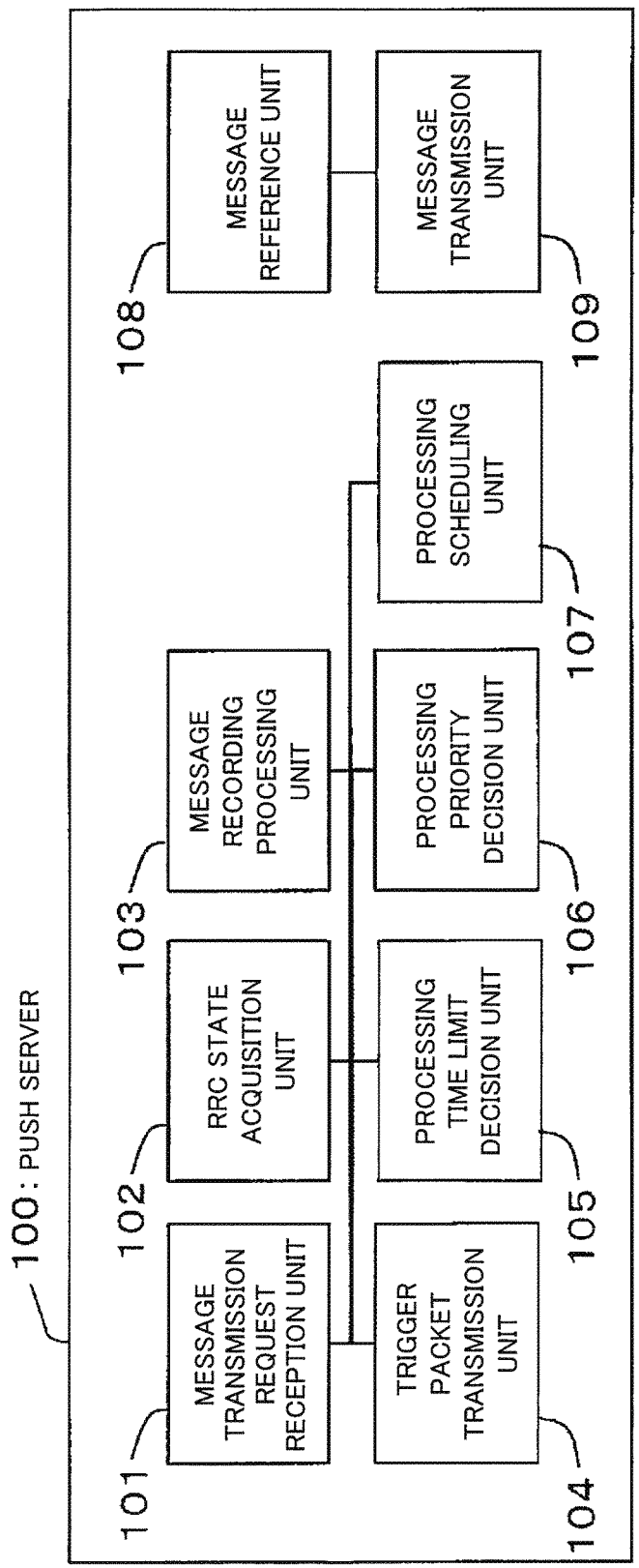
FIG. 3 is a block diagram illustrating a configuration example of a push server in the exemplary embodiment 1 of the present invention.

As illustrated in FIG. 3, each of the push servers 100-1 to 100-*n* includes a message transmission request reception unit 101, an RRC state acquisition unit 102, a message recording processing unit 103, a trigger packet transmission unit 104, a processing time limit decision unit 105, a processing priority decision unit 106, a processing scheduling unit 107, a message reference unit 108, and a message transmission unit 109.

The message transmission request reception unit 101 receives a message transmission request for the information processing terminal 300 from the app server 400. The message transmission request, for example, includes a message to be transmitted, an identifier for identifying the information processing terminal 300 serving as a message transmission destination, and an identifier for specifying the app 320 that notifies a message.

The RRC state acquisition unit 102 acquires a current RRC state of the information processing terminal 300. The information processing terminal 300 is a destination of a message to be transmitted according to the message transmission request received in the message transmission request reception unit 101. The current RRC state, for example, can be acquired from a base station (not illustrated) included in a radio communication network. In this case, the RRC state acquisition unit 102 transmits both the identifier for identifying the information processing terminal 300 serving as the message transmission destination and an inquiry request of the RRC state to the base station, and receives the current RRC state of the information processing terminal 300 serving as the message transmission destination as a reply thereof.

Furthermore, based on a communication history of the push server and the information processing terminal 300, it is also possible to estimate the current RRC state of the information processing terminal 300 serving as the message transmission destination. For example, the RRC state of an information processing terminal 300, which has communicated with the push server over the last several seconds, is a communicable state (for example, DCH). Furthermore, the RRC state of an information processing terminal 300, which has not performed communication over the last several second or mores, can be estimated to be a pause state (for example, IDLE). Furthermore, the RRC state may also be acquired by other methods.

The message recording processing unit 103 performs a process of recording a message, which is included in the message transmission request received in the message transmission request reception unit 101 and is to be transmitted to the information processing terminal 300, in the message database 200.

The trigger packet transmission unit 104 transmits a trigger packet, which is a packet for notifying that the message designated by the message transmission request is not transmitted and exists in the push server (standby the transmission), to the information processing terminal 300 serving as the message transmission destination.

The processing time limit decision unit 105 decides a processing time limit termination time of a process, which is performed by the message recording processing unit 103, on the basis of the RRC state of the information processing terminal 300 acquired by the RRC state acquisition unit 102. Herein, it is assumed that the "processing time limit termination time" is obtained by adding a "processing time limit corresponding to the RRC state of the information processing terminal 300" to a "trigger packet transmission time". That is, it is assumed that the "processing time limit termination time is equal to the trigger packet transmission time+the processing time limit corresponding to the RRC state of the information processing terminal 300".

Herein, the trigger packet transmission time is a time at which a trigger packet is transmitted to the information processing terminal 300 serving as the message transmission destination.

Furthermore, the processing time limit corresponding to the RRC state of the information processing terminal 300, for example, has a value of 3 seconds when the state of the information processing terminal 300 serving as the message transmission destination is the pause state and a value of 0.1 second when the state of the information processing terminal 300 serving as the message transmission destination is the communicable state.

Figure 1:
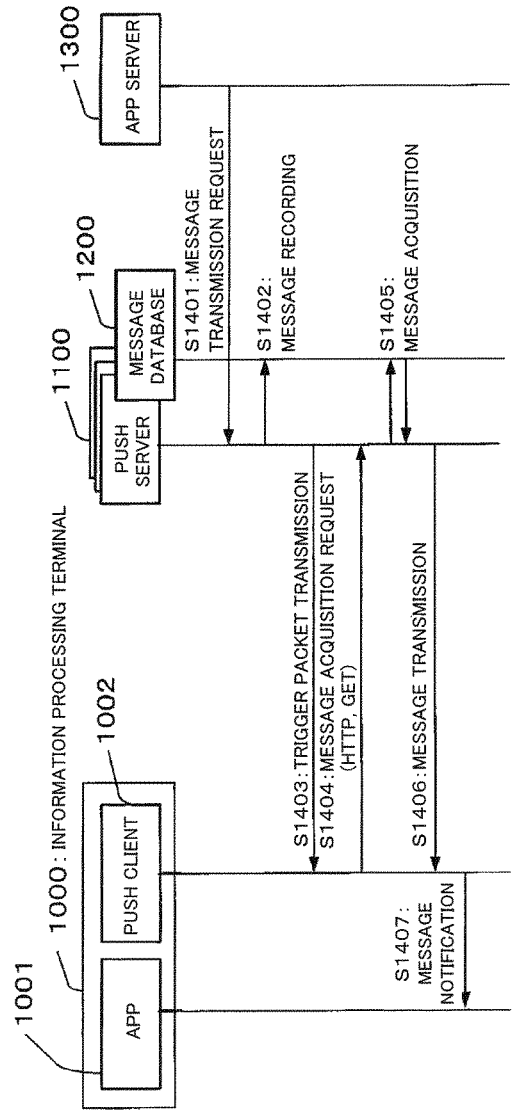
FIG. 1 is a sequence diagram illustrating the flow of a message transmission process of a push server in a general technology.
Figures 2, 4:
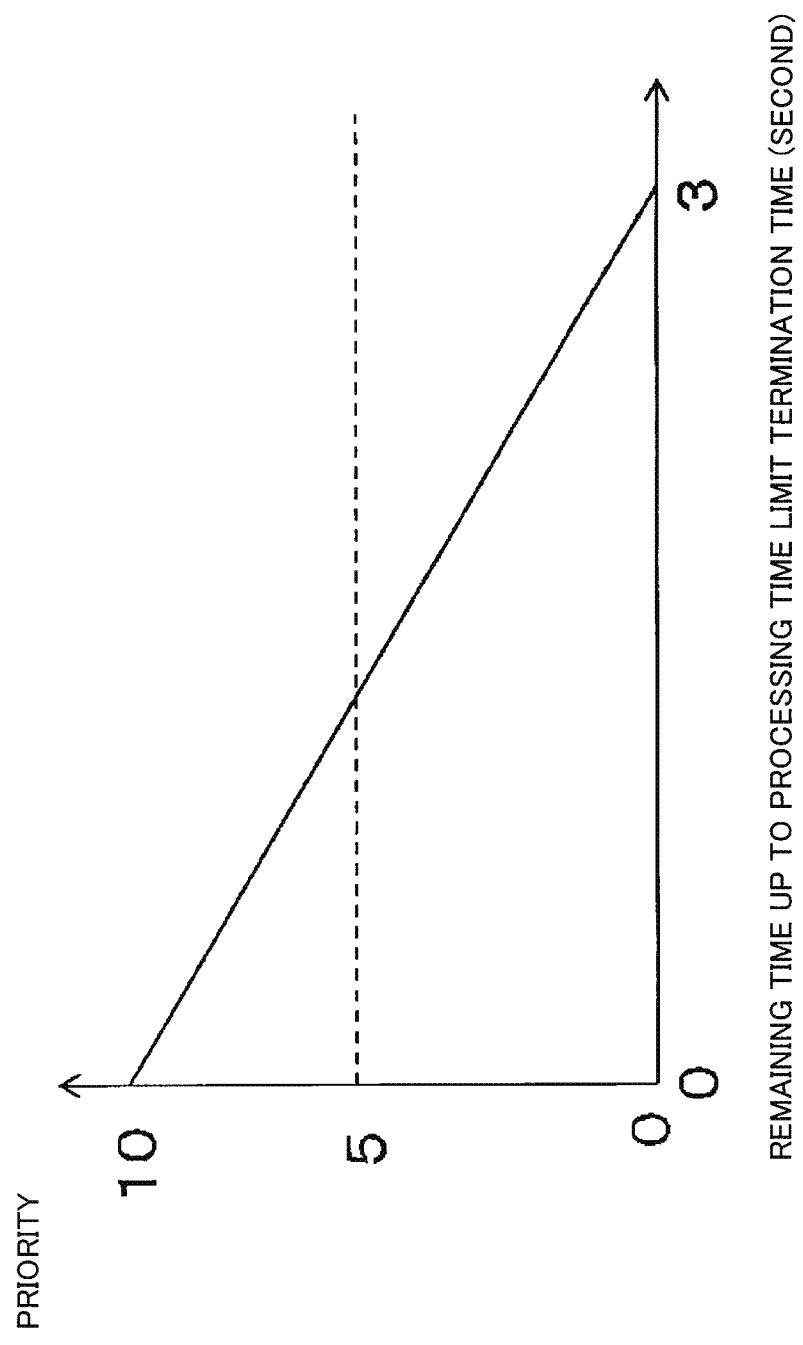

In addition, FIG. 4-1 is a conceptual diagram illustrating the processing time limit and the processing time limit termination time. As illustrated in FIG. 4-1, the processing time limit is set to be short when the state of the information processing terminal 300 serving as the message transmission destination is the communicable state, and is set to be long when the state of the information processing terminal 300 serving as the message transmission destination is the pause state.

In addition, the values of 3 seconds and 0.1 second exemplified in the above are only an example, and arbitrary values may be employed according to a communication scheme to be conformed and a mounting environment. Furthermore, in the exemplary embodiment 1, the state of the information processing terminal 300 is classified into two states of the communicable state and the pause state, but this may also be more finely classified. For example, when it is assumed that the state is changed to three stages of a high speed communicable state, a low speed communicable state, and the pause state, different processing time limits corresponding to the RRC state may also be set for these three states.

The processing priority decision unit 106 decides priorities of the process performed by the message recording processing unit 103 and the process performed by the trigger packet transmission unit 104. Herein, the process performed by the message recording processing unit 103 is the message recording process. Furthermore, the process performed by the trigger packet transmission unit 104 is the trigger packet transmission process. In addition, the message recording process corresponds to a "preparation process" of the present invention. Furthermore, the trigger packet transmission process corresponds to a "notification process" of the present invention.

The processing priority, for example, is decided as follows. Firstly, the processing priority is expressed by an integer of 0 to 10. Furthermore, as the numerical value is large, the priority is high. Moreover, the priority of the trigger packet transmission process is assumed to be a predetermined value decided in advance. For example, a center value is assumed to be 5. In addition, the priority of the trigger packet transmission process may also be set as values other than 5 according to the mounting environment of the present exemplary embodiment. On the other hand, the processing priority of the message recording process is changed according to a remaining time up to the processing time limit termination time.

FIG. 4-2 is a graph illustrating a relation between the remaining time up to the "processing time limit termination time" of the message recording process and the processing priority. As illustrated in FIG. 4-2, as the remaining time up to the processing time limit termination time is short, the processing priority becomes high. A message recording process, in which the remaining time up to the processing time limit termination time is shorter than a predetermined value, has a high priority as compared with the trigger packet transmission process, and the priority of a message recording process, in which the remaining time up to the processing time limit termination time is longer than a predetermined value (1.5 seconds in the example of FIG. 4-2), is lower than that of the trigger packet transmission process. In addition, the priority of a message recording process, in which the processing time limit termination time has passed, has a maximum value. Herein, the maximum value is assumed to be 10. Furthermore, it is assumed that a processing time limit corresponding to the RRC state is the longest 3 seconds this time. Accordingly, the remaining time up to the processing time limit termination time is also the longest 3 seconds. Thus, all priorities of message recording processes, in which the remaining time up to the processing time limit termination time is equal to or more than 3 seconds, are assumed to 0. It is assumed that the priority is increased one by one whenever the remaining time up to the processing time limit termination time is 3 seconds flat and then 0.3 second passes.

The processing scheduling unit 107 performs processing scheduling of the message recording process, which is performed by the message recording processing unit 103, and the trigger packet transmission process, which is performed by the trigger packet transmission unit 104, according to the priority decided by the processing priority decision unit 106. In detail, the processing scheduling unit 107 performs scheduling such that a process with a high processing priority is preferentially performed.

The message reference unit 108 acquires a message, which is transmitted to the information processing terminal 300, with reference to the message database 200.

The message transmission unit 109 transmits the message acquired by the message reference unit 108 to the information processing terminal 300.

Figure 5:
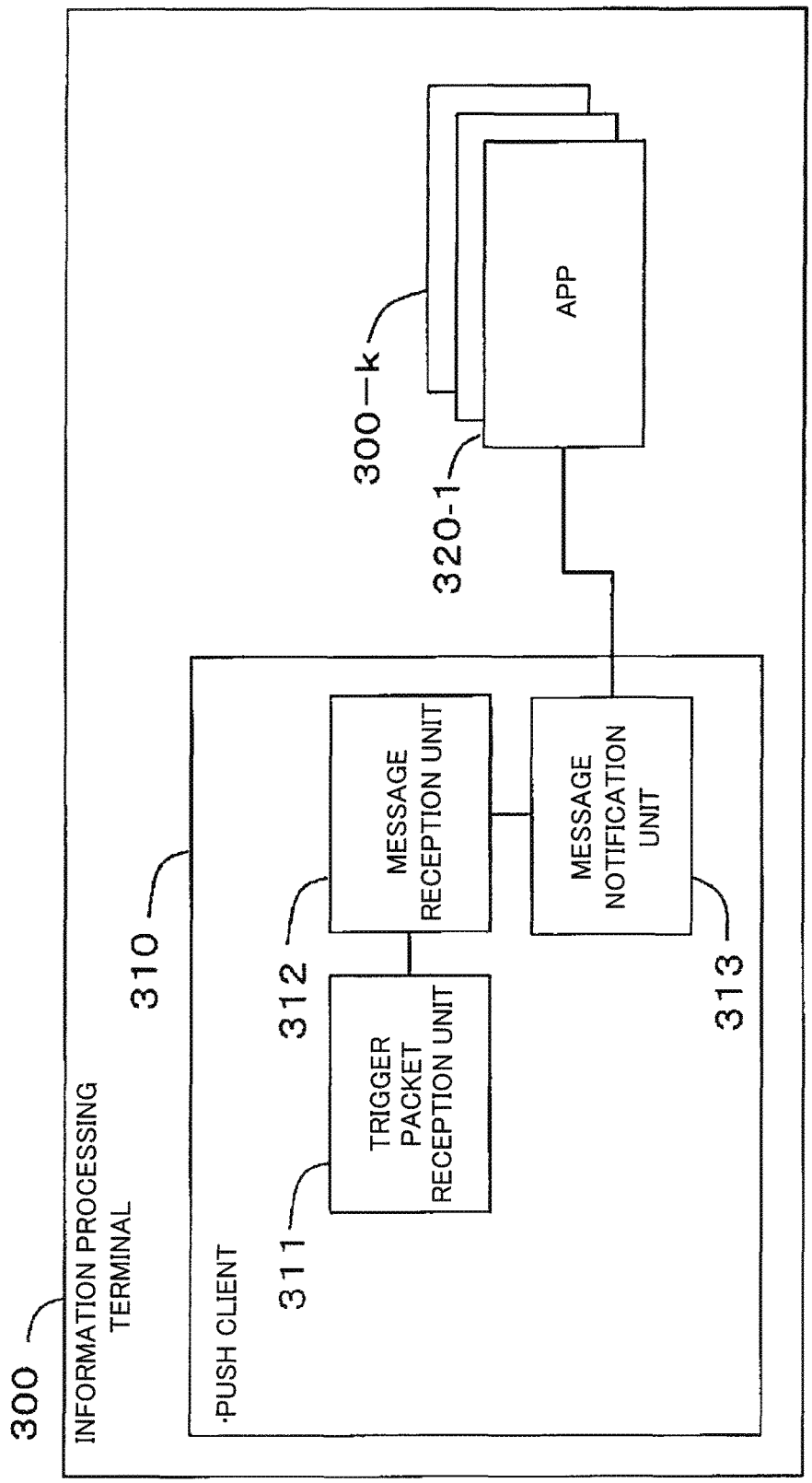
FIG. 5 is a block diagram illustrating a configuration example of an information processing terminal in the exemplary embodiment 1 of the present invention.

Subsequently, a description will be given with reference to FIG. 5 which is a block diagram illustrating the functional block of the information processing terminal 300 in the exemplary embodiment 1.

The information processing terminal 300 includes a push client 310 and apps 320-1 to 320-k. Furthermore, the push client 310 includes a trigger packet reception unit 311, a message reception unit 312, and a message notification unit 313.

The trigger packet reception unit 311 receives the trigger packet transmitted by the trigger packet transmission unit 104 of the push server 100.

After the trigger packet reception unit 311 receives the trigger packet, the message reception unit 312 transmits a message acquisition request to the message transmission unit 109 of the push server 100. The message transmission unit 109 of the push server 100 having received the message acquisition request transmits a message as a response of the message acquisition request, and the message reception unit 312 of the information processing terminal 300 receives the message.

The message notification unit 313 notifies the app 320 designated as a destination of a message of the message received in the message reception unit 312.

The apps 320-1 to 320-k are apps using a message, and detailed uses and types of the apps may be any uses and types and are not particularly limited.

So far, each functional block of the exemplary embodiment 1 has been described in detail. In addition, FIGS. 2, 3, and 5 illustrate only the functional blocks particularly relating to the exemplary embodiment 1, but this is for convenience of description.

That is, in the exemplary embodiment 1, it is not intended that the presence of functional blocks other than the illustrated functional blocks is prohibited. For example, the push server 100, the message database 200, the information processing terminal 300, and the app servers 400-1 to 400-j respectively include functional blocks such as a communication unit, a control unit, and a recording unit (not illustrated) therein or out of them. Furthermore, each functional block illustrated or not illustrated may also be used only in a specific operation of the exemplary embodiment 1, but may also be commercially used for other uses. For example, each functional block may also be used for packet communication other than the execution of apps or transmission/reception of a push message.

Next, a basic operation of the exemplary embodiment 1 will be described with reference to a sequence diagram of FIG. 6 and a flowchart of FIG. 7.

Figure 6:
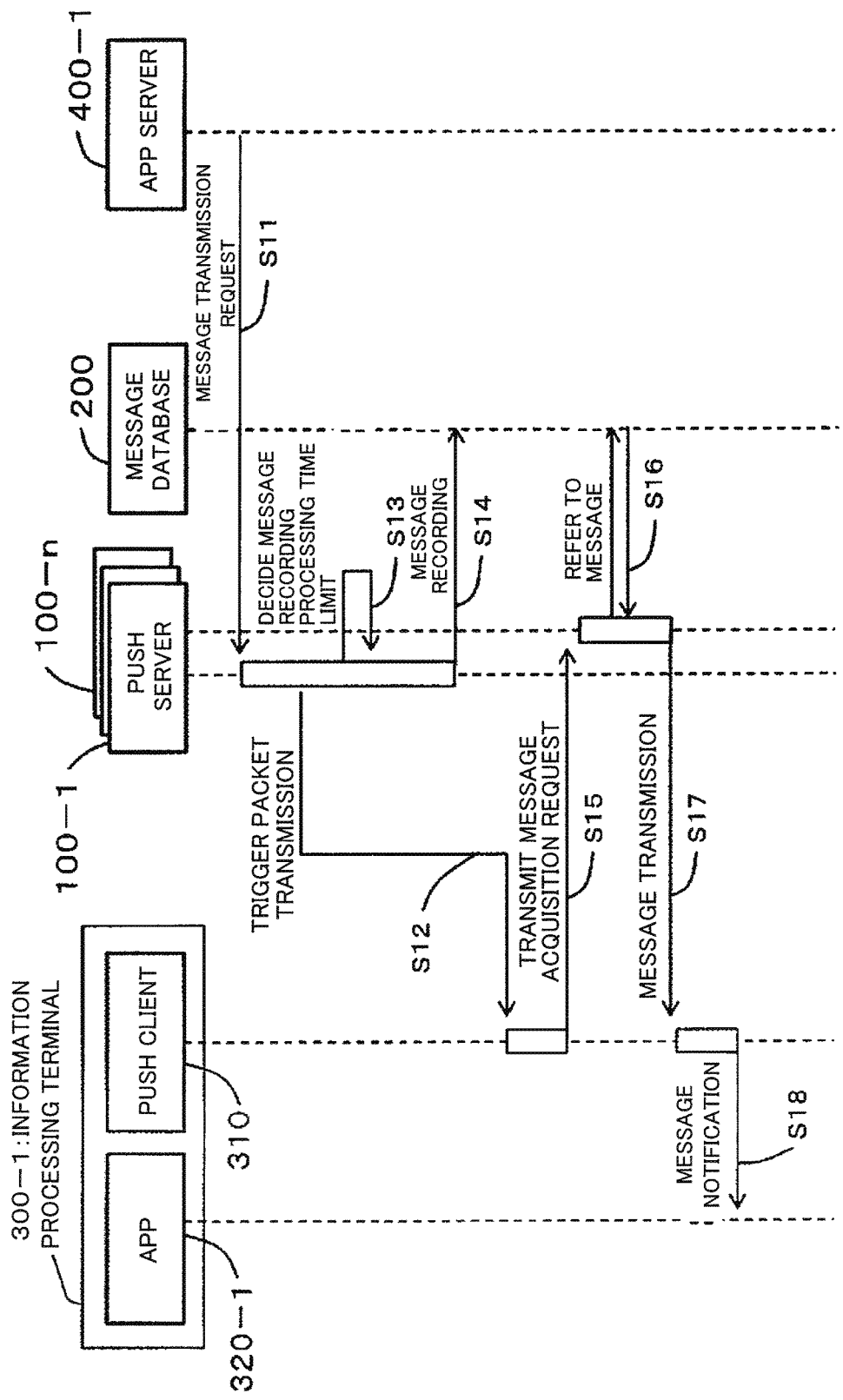
FIG. 6 is a sequence diagram illustrating an operation example in the exemplary embodiment 1 of the present invention.
Figure 7:
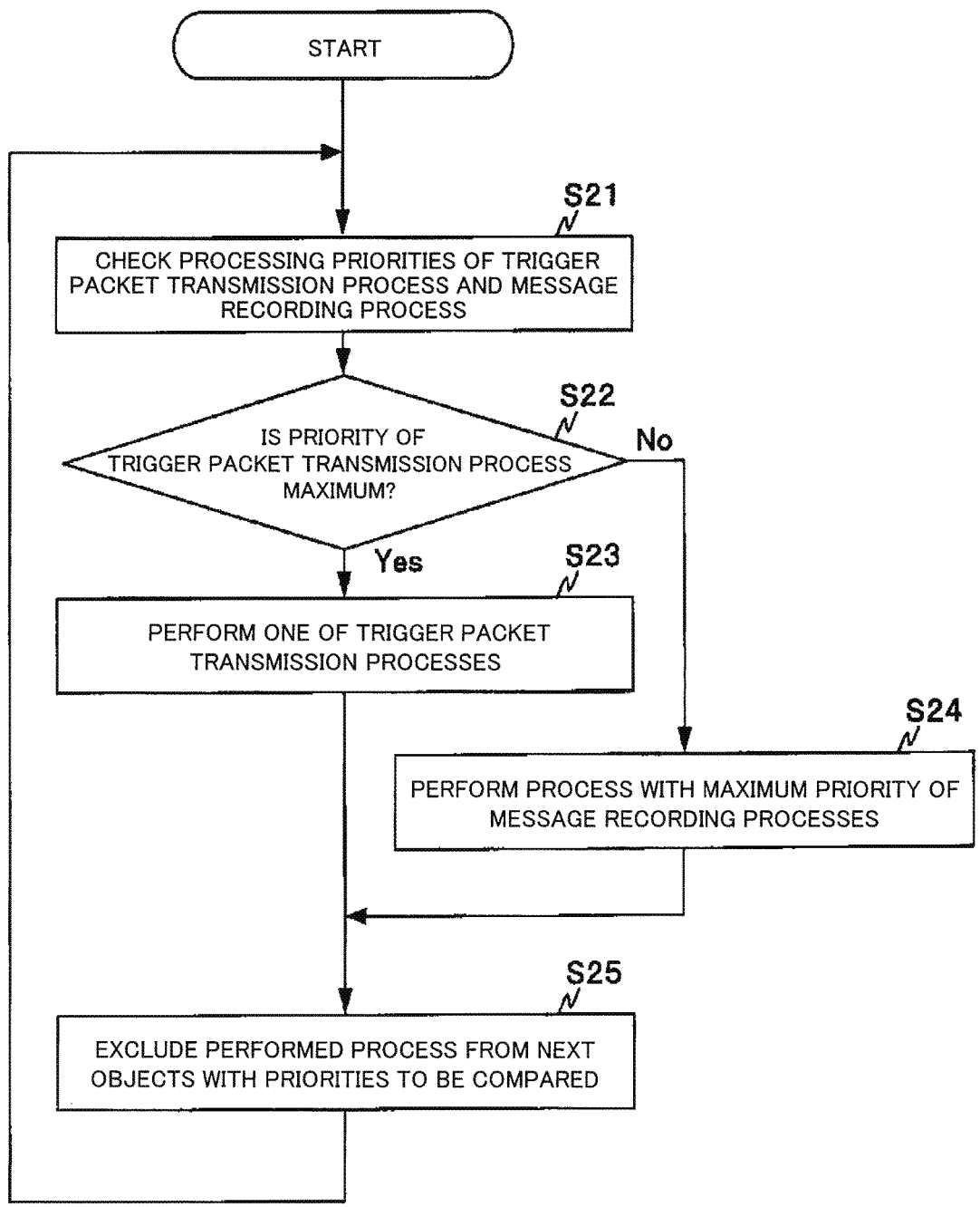
FIG. 7 is a flowchart illustrating an example of a processing schedule method in the exemplary embodiment 1 of the present invention.

FIG. 6 is a sequence diagram illustrating an entire operation example of the exemplary embodiment 1. In the present operation example, a description will be provided for the case in which the app server 400-1 transmits a message to the app 320-1 operating on the information processing terminal 300-1.

Initially, the app server 400-1 transmits a message transmission request to the message transmission request reception unit 101 of the push server 100 (step S11).

In the present operation example, the message transmission request in step S11 is assumed to be allocated to the push server 100-1 by a load balancer (a load distribution apparatus). That is, the push server 100 having received the message transmission request is assumed to be the push server 100-1. Herein, the message transmission request includes an identifier of each of the information processing terminal 300 serving as the message destination and the app 320, and a message. In the present operation example, since the message destination is the app 320-1 of the information processing terminal 300-1, the message transmission request includes an identifier indicating the information processing terminal 300-1 and an identifier indicating the app 320-1. The message transmission request, for example, is transmitted by a POST method stipulated by HTTP (Hypertext Transfer Protocol).

Next, the trigger packet transmission unit 104 of the push server 100-1 transmits a trigger packet to the information processing terminal 300-1 serving as the message transmission destination (step S12). In addition, the process of step S12 is performed at the time point at which the processing scheduling unit 107 of the push server 100-1 has determined that the process should be started.

The determination of the processing scheduling unit 107 will be described in detail with reference to FIG. 7. FIG. 7 is a flowchart illustrating an example of an operation when performing scheduling of the process performed by the processing scheduling unit 107.

Firstly, the processing scheduling unit 107 checks processing priorities of trigger packet transmission processes and message recording processes not currently processed in the push server 100 (step S21). The processing priority of each process is evaluated by the processing priority decision unit 106. In addition, at the time of evaluation of the processing priority, a remaining time up to a processing time limit termination time at the current time point of the message recording process is firstly calculated. The processing priority is evaluated according to the remaining time. This is because the processing priority of the message recording process becomes high as the processing time limit termination time is approached as described above. On the other hand, for the trigger packet transmission processes, since a priority is constant, the priority does not need to be calculated again.

Herein, when the processing priority of the trigger packet transmission processes is maximum (Yes in step S22), the trigger packet transmission unit 104 performs one of the trigger packet transmission processes (step S23). Herein, in the present operation example, the processing priority of the trigger packet transmission processes is 5. Therefore, in the case of Yes in step S22, there is a case in which there are no message recording processes not processed. Alternatively, even though there are the message recording processes not processed, there is a case in which there is a margin up to the processing time limit termination time and the priority is still equal to or less than 4.

In addition, where there is a plurality of trigger packet transmission processes in step S23, it is possible to arbitrarily decide a reference regarding a trigger packet transmission process to be performed. For example, it is considered to perform a trigger packet transmission process corresponding to a message transmission request received the longest time ago. In addition, for example, a trigger packet transmission process may also be performed according to the app server 400 which is a transmission source of the message transmission request. For example, a trigger packet transmission process corresponding to a message transmission request of the app server 400-1 may also be preferentially performed before a trigger packet transmission process corresponding to a message transmission request of another app server 400 other than the app server 400-1. Furthermore, similarly, a trigger packet transmission process may also be performed according to the information processing terminal 300 which is a transmission destination.

On the other hand, when the processing priority of the message recording processes is maximum (No in step S22), the message recording processing unit 103 performs a process with a maximum priority of the message recording processes (step S24). Herein, in the present operation example, the processing priority of the trigger packet transmission processes is 5. Therefore, in the case of No in step S22, there is a case in which there are no trigger packet transmission processes not processed. Alternatively, even though there are the trigger packet transmission processes not processed, separately from this, there is a case in which there is no margin up to the processing time limit termination time and there are message recording processes with a priority equal to or more than 6. In addition, a plurality of message recording processes with a maximum priority may exist in step S24. For example, there is a case in which a plurality of message recording processes with a priority of 8 exists. In this case, a message recording process to be performed by a reference equal to that in the aforementioned step S23 is selected. Furthermore, when priorities are equal to each other, remaining times up to the processing time limit termination time may also be strictly compared with each other, and a message recording process with a small remaining time up to at least the processing time limit termination time may also be selected and performed.

In addition, the priority of the trigger packet transmission processes is 5, but both the trigger packet transmission processes and a message recording process with a priority of 5 may exist and moreover, a message recording process with a priority equal to or more than 6 may not exist. In this case, the priority of the trigger packet transmission processes is not determined to be maximal (No in step S22). Accordingly, in step S24, the message recording processing unit 103 performs a process with a maximum priority of the message recording processes (step S24).

Actually, there is a case in which both such a trigger packet transmission processes and the message recording process with a priority of 5 exists and moreover, the message recording process with a priority equal to or more than 6 does not exist. At this time, the priority of the trigger packet transmission processes may also be determined to be maximal (Yes in step S22). In this case, one of the trigger packet transmission processes is performed (step S23). Furthermore, the priority of the trigger packet transmission processes, for example, may also be set to 5.5 in order to prevent the occurrence of such a situation. Since the priority of the message recording processes is limited to an integer, there is no case in which the priority is set to 5.5. Accordingly, there is no case in which the priorities of the message recording processes and the trigger packet transmission processes are equal to each other, so that a difference between the priorities always occurs.

After step S23 or step S24 is completed, the procedure proceeds to step S25. A process, in which the message recording process or the trigger packet transmission process performed in step S23 or step S24 is excluded from next objects with priorities to be compared (step S25). Thereafter, the procedure returns to step S21 again and the similar process is repeated.

Referring again to FIG. 6, after the trigger packet transmission unit 104 of the push server 100-1 transmits the trigger packet to the information processing terminal 300-1 (step S12), the processing time limit decision unit 105 decides the processing time limit termination time of the message recording process (step S13). The setting of the processing time limit termination time is performed by adding the "processing time limit corresponding to the RRC state of the information processing terminal 300" to the "trigger packet transmission time" as described above.

Thereafter, the message recording processing unit 103 of the push server 100-1 records a message in the message database 200 (step S14). This message is included in the message transmission request received in step S11. Detailed information recorded in the message database 200 is the identifiers of the information processing terminal 300-1 serving as the message destination and the app 320-1 and a message body. In addition, the process of step S14 is performed at the time point at which the processing scheduling unit 107 of the push server 100-1 has determined that the process should be started.

While the message recording processing unit 103 is operating, when the trigger packet reception unit 311 of the information processing terminal 300-1 receives the trigger packet, the message reception unit 312 transmits a message acquisition request to the push server 100 (step S15).

In the present operation example, it is assumed that the push server 100-n has allocated treatment for the message acquisition request. In addition, a push server 100 having transmitted the trigger packet and a push server 100 receiving the message acquisition request are allocated by a load balancer, and the push servers 100 are not generally equal to each other.

The message acquisition request includes the identifier of the information processing terminal 300-1 having transmitted the message acquisition request. The message acquisition request, for example, is transmitted by a GET method of HTTP. When the message transmission unit 109 of the push server 100-n receives the message acquisition request, the message reference unit 108 refers to the message database 200. On the basis of the identifier of the information processing terminal 300-1 included in the message acquisition request, the message transmission unit 109 of the push server 100-n acquires a message to be transmitted to the information processing terminal 300-1 (step S16).

Next, the message transmission unit 109 of the push server 100-n transmits the message acquired by the message reference unit 108 to the information processing terminal 300-1 as a response of a message transmission request (step S17). In step S17, information to be transmitted to the information processing terminal 300-1 includes the identifier of the app 320-1 serving as a destination and a message body. The response of the message transmission request, for example, is transmitted by 200OK (HTTPstatuscode200) which is a status code of HTTP. After the message reception unit 312 of the information processing terminal 300-1 receives the message, the message notification unit 313 notifies the app 320-1 designated as a message destination of the message (step S18).

So far, as described above, in the exemplary embodiment 1, the transmission of a trigger packet is preferentially performed before a message recording process. Therefore, a time until the trigger packet reaches an information processing terminal after an app server receives a message transmission request becomes short, so that delay until a message reaches the information processing terminal becomes small.

Furthermore, in the exemplary embodiment 1, in consideration of the RRC state, a priority is added to each of a plurality of message recording processes. Consequently, it is possible to avoid a problem that when it is intended to preferentially transmit a message to an information processing terminal capable of performing communication and immediately receiving a packet, a message recording process is not still ended. On the other hand, until it is intended to transmit a message to an information processing terminal in a pause state, it is also possible to end a message recording process with respect to the information processing terminal in the pause state. That is, in the exemplary embodiment 1, until a message acquisition request from an information processing terminal having received a trigger packet reaches a push server, a message recording process necessary for the transmission of a message is completed. Consequently, the push server can immediately return a response including a message with respect to the message acquisition request.

So far, according to the exemplary embodiment 1, even though a push server receives a plurality of message transmission requests and thus a large load is applied thereto, it is possible to suppress an increase in delay generating from the time when a push message reaches a terminal from the push server to the time the push server receives the message transmission requests.

Exemplary Embodiment 2

Subsequently, an exemplary embodiment 2 obtained by modifying a part of the exemplary embodiment 1 will be described.

In the exemplary embodiment 1, the case in which the RRC state of an information processing terminal serving as a message transmission destination is reliable has been described. On the other hand, in the present exemplary embodiment, the case in which a certain level of uncertainty is included in an acquired RRC state will be described.

Herein, an event in which uncertainty is included in an acquired RRC state, for example, includes the case in which information of the RRC state of an information processing terminal is obtained from a base station of a radio communication network only at a constant period. In this case, a time point at which information has been obtained from the base station is different from a time point at which a message is transmitted, resulting in the occurrence of a time leg. Therefore, there is a case in which the RRC state of the information processing terminal is changed until the message is transmitted after the information is obtained from the base station. In such a case, two problems occur as described below.

For example, although the RRC state has been a pause state at the time point at which the information has been obtained from the base station, a case in which the RRC state becomes a communicable state at the time point at which the message is transmitted because subsequent communication has been performed is considered. In this case, since it is not necessary to wait for the transmission of the message, it is preferable to quickly perform a message recording process, but since the acquired RRC state has been the pause state, a processing time limit is set to be long and the priority of the message recording process becomes low. In such a case, when a message acquisition request from an information processing terminal having received a trigger packet has reached a push server, the message recording process is not completed. Therefore, the push server is not able to immediately transmit a message and a message transmission process needs to wait for until the message recording process is completed, resulting in an increase in delay until the message reaches the information processing terminal, which is called a first problem.

On the other hand, although the RRC state has been a communicable state at the time point at which the information has been obtained from the base station, a case in which the RRC state becomes a pause state at the time point at which the message is transmitted because subsequent communication has not been performed is considered. In this case, it is necessary to wait for the transmission of the message until the RRC state becomes the communicable state. Accordingly, it is not necessary to preferentially perform a message recording process, but since the acquired RRC state has been the communicable state, the message recording process is preferentially performed. Therefore, another message recording process to be preferentially performed is postponed, which is called a second problem.

As described above, when uncertainty is included in the acquired RRC state, a problem occurs from the fact that it is not possible to correctly set a processing time limit of a message recording process. In this regard, an object of the exemplary embodiment 2 is to solve the first problem.

Figure 8:
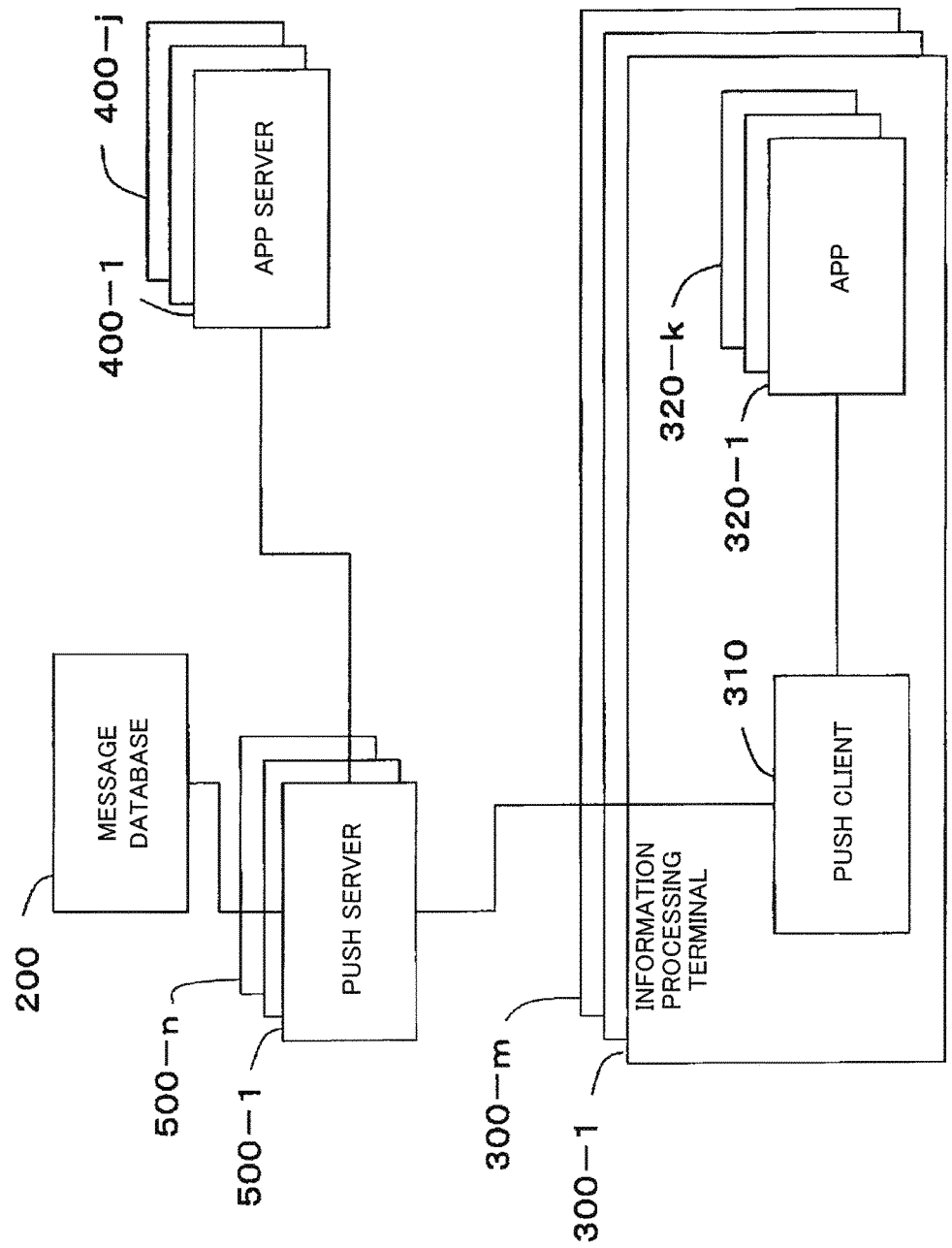
FIG. 8 is a block diagram illustrating a configuration example of a system in the exemplary embodiment 2 of the present invention.

FIG. 8 is a block diagram illustrating a system configuration of the exemplary embodiment 2. Referring to FIG. 8, the exemplary embodiment 2 includes push servers 500-1 to 500-n, the message database 200, the information processing terminals 300-1 to 300-m, and the app servers 400-1 to 400-j.

A difference with the exemplary embodiment 1 is that the push servers 100-1 to 100-n have been replaced with the push servers 500-1 to 500-n. Accordingly, only the push servers 500-1 to 500-n will be described below. On the other hand, since the message database 200, the information processing terminals 300-1 to 300-m, and the app servers 400-1 to 400-j and a connection and the like between these elements and the push servers 500-1 to 500-n are similarly to those of the exemplary embodiment 1, a detailed description thereof will be omitted.

Figure 9:
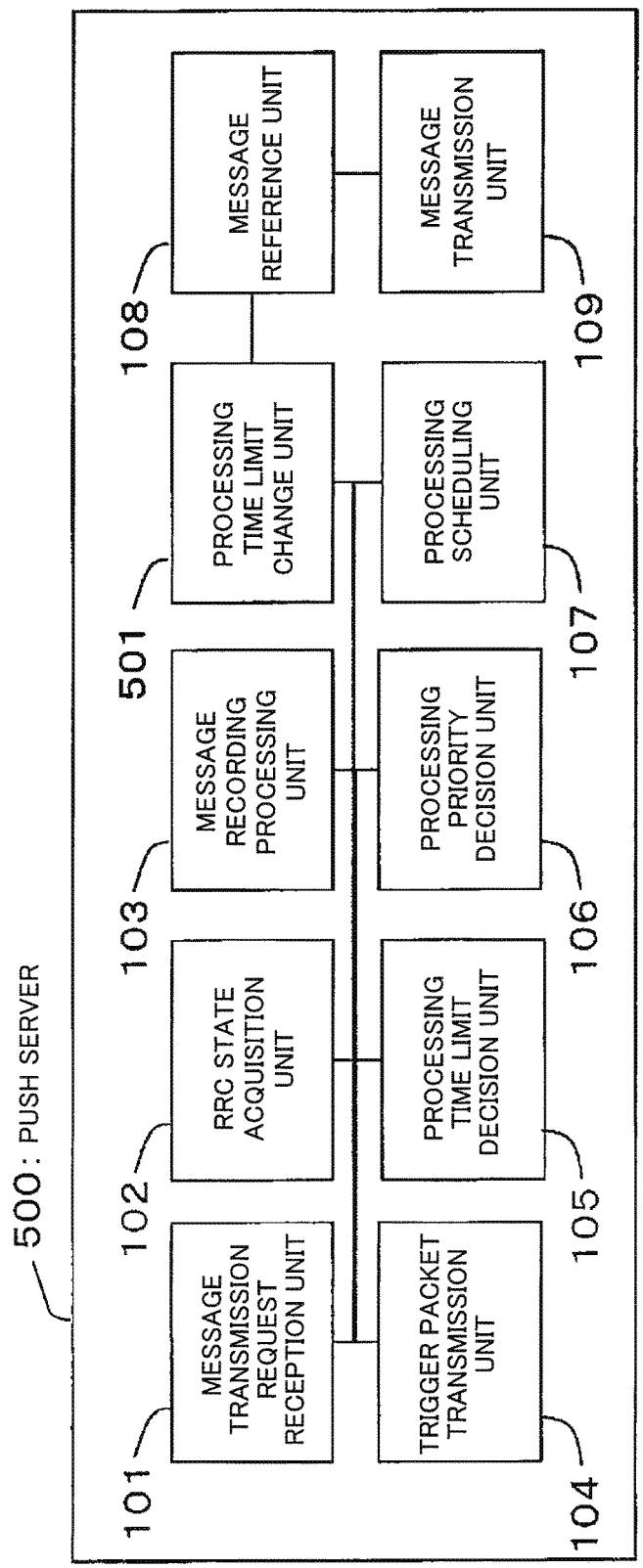
FIG. 9 is a block diagram illustrating a configuration example of a push server in the exemplary embodiment 2 of the present invention.

FIG. 9 is a block diagram illustrating a configuration of the push server 500 in the exemplary embodiment 2. The push server 500 in the exemplary embodiment 2 is different from the push server 100 in the exemplary embodiment 1 in that the push server 500 has a processing time limit change unit 501. In addition, the same reference numerals are used to designate the same elements as those of the push server 100 in the exemplary embodiment 1, a detailed description thereof will be omitted.

The processing time limit change unit 501 changes a processing time limit of a message recording process decided by the processing time limit decision unit 105.

Figure 10:
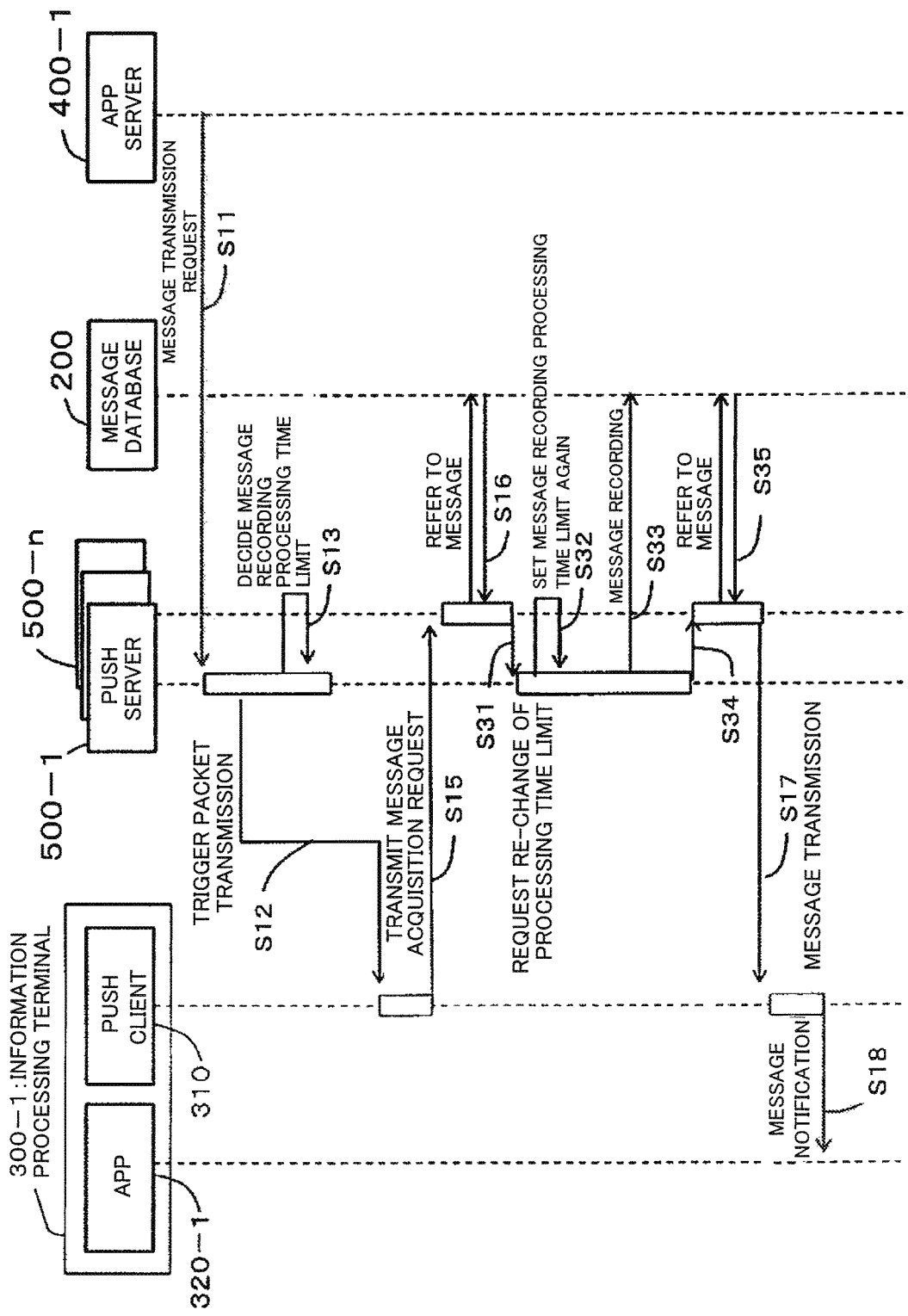
FIG. 10 is a sequence diagram illustrating an operation example in the exemplary embodiment 2 of the present invention.

Next, a basic operation of the exemplary embodiment 2 will be described with reference to a sequence diagram of FIG. 10. In the present operation example, a described will be provided for the case in which the app server 400-1 transmits a message to the app 320-1 operating on the information processing terminal 300-1. Furthermore, a described will be provided for the case in which a push server 500-1 receives a message transmission request transmitted from the app server 400-1 and a push server 500-n receives a message acquisition request transmitted from the information processing terminal 300-1. In addition, the fact that a push server 500 receiving the message transmission request and a push server 500 receiving the message acquisition request are different from each other is because allocation by the load balancer is performed as described in the exemplary embodiment 1.

In the sequence of the exemplary embodiment 2, step 11 to step 13 in which the push server 500-1 decides the recording processing time limit of a message are equal to those of the exemplary embodiment 1. Actually, in the operation example of the exemplary embodiment 2, differently from the operation example of the exemplary embodiment 1, before a message recording process is completed, the push server 500-n receives a message acquisition request from the information processing terminal 300 (step S15). This is because although the RRC state of the information processing terminal 300-1 has been determined to be the pause state as described above, the RRC state of the information processing terminal 300-1 is actually the communicable state and thus a message acquisition request from the information processing terminal 300-1 is quickly returned than assumed after a trigger packet is transmitted.

It is assumed that the message reference unit 108 of the push server 500-n having received the message acquisition request from the information processing terminal 300-1 refers to the message database 200 and acquires a message addressed to the information processing terminal 300-1. However, since a recording process of the message addressed to the information processing terminal 300-1 has not been completed, the message reference unit 108 fails in acquiring the message (step S16). In this case, it is preferable to quickly perform a message recording process with respect to the message addressed to the information processing terminal 300-1. However, since the RRC state of the information processing terminal 300-1 has been determined to be the pause state, the priority of the message recording process is still low with respect to the message addressed to the information processing terminal 300-1.

In this regard, the processing time limit change unit 501 of the push server 500-n changes the processing time limit of the message recording process with respect to the message addressed to the information processing terminal 300-1.

The processing time limit change unit 501 of the push server 500-n transmits a processing time limit change request to the push server 500-1 intended to perform the message recording process addressed to the information processing terminal 300-1, and requests a change in the processing time limit of the message recording process (step S31). At this point, as described above, in the present exemplary embodiment, since each process performed by the push server 500 is allocated by the load balancer, the same push server 500 does not consistently perform all processes. Therefore, the push server 500-n does not hold information regarding a push server 500 which takes charge of the message recording process addressed to the information processing terminal 300-1. Thus, the processing time limit change units 501 included in each push server 500 searches for the push server 500, which takes charge of the message recording process, in cooperation with one another. In the following description, in order to clearly distinguish respective processing time limit change units 501 from one another, a reference numeral is added to the end of the processing time limit change unit 501 similarly to the push server 500. For example, a processing time limit change unit 501 included in the push server 500-1 is expressed as a processing time limit change unit 501-1, and a processing time limit change unit 501 included in the push server 500-*n* is expressed as a processing time limit change unit 501-*n*.

Firstly, the processing time limit change unit 501-*n* of the push server 500-*n* transmits a processing time limit change request to all processing time limit change units 501 (the processing time limit change unit 501-1 to the processing time limit change unit 501-*n*-1) included in other push servers 500 other than the push server 500-*n*.

The processing time limit change request holds an identifier indicating the push server 500-*n* which is the push server 500 including the processing time limit change unit 501-*n* having transmitted the request, and an identifier for identifying the information processing terminal 300-1 serving as the message destination.

Each of the processing time limit change units 501 (the processing time limit change unit 501-1 to the processing time limit change unit 501-*n*-1) having received the processing time limit change request, other than the processing time limit change unit 501-*n*, performs certain determination on the basis of the identifier of the information processing terminal 300-1 serving as the message destination, which is included in the processing time limit change request. The determination is for determining whether the push server 500 including the processing time limit change unit 501 (the processing time limit change unit 501-1 to the processing time limit change unit 501-*n*-1) is a push server 500 intended to perform a message recording process of the information processing terminal 300-1. That is, the processing time limit change unit 501-1 determines whether the push server 500-1 is the push server 500 intended to perform the message recording process of the information processing terminal 300-1. Similarly, another processing time limit change unit 501 (for example, the processing time limit change unit 501-2) determines whether the push server 500-2 is the push server 500 intended to perform the message recording process of the information processing terminal 300-1.

Furthermore, there may occur a case in which the push server 500 performing the message recording process addressed to the information processing terminal 300-1 is the push server 500-*n* itself having received the message acquisition request in step S15. Therefore, the processing time limit change unit 501-*n* of the push server 500-*n* checks whether the push server 500-*n* is intended to perform the message recording process of the information processing terminal 300-1.

In this example, a push server intended to perform the message recording process of the information processing terminal 300-1 this time is the push server 500-1. Therefore, the processing time limit change unit 501-1 of the push server 500-1 having received the processing time limit change request determines that the push server 500-1 is intended to perform the message recording process of the information processing terminal 300-1 and changes the processing time limit of the message recording process (step S32). This is determined on the basis of the identifier of the information processing terminal 300-1 serving as a message destination, which is included in the processing time limit change request. On the other hand, another processing time limit change unit 501 (the processing time limit change unit 501-2 to the processing time limit change unit 501-*n*-1) determines that a push server 500 including the other processing time limit change unit 501 is not intended to perform the message recording process, and does not particularly perform any more process. Similarly, the processing time limit change unit 501-1, which is a transmission source of a processing time limit change request, also determines that the push server 500-1 is not intended to perform the message recording process, and does not particularly perform any more process.

Herein, the processing time limit of the message recording process is changed by the processing time limit change unit 501-1, and a processing time limit termination time becomes a current time. By this change, a remaining up to the processing time limit termination time of the message recording process becomes zero. Therefore, the priority of the message recording process addressed to the information processing terminal 300-1 is set to 10 which is a maximum value. In this way, the processing priority decision unit 106 and the message recording processing unit 103 perform the message recording process addressed to the information processing terminal 300-1 with the highest priority (step S33).

The processing time limit change unit 501-1 of the push server 500-1 having completed the message recording process notifies the processing time limit change unit 501-*n* of the push server 500-*n* of the completion of the message recording process (step S34).

At this time, the processing time limit change unit 501-*n* serving as a notification destination is decided on the basis of the identifier of the push server 500-*n* having transmitted a change request included in the processing time limit change request. The processing time limit change unit 501-*n* notifies the message reference unit 108 included in the push server 500-*n* of information indicating the fact that the message recording process has been completed. The message reference unit 108 having received the notification refers to the message database 200 again, and acquires a message addressed to the information processing terminal 300-1 (step S35).

The message transmission unit 109 transmits the message acquired in step S35 to the information processing terminal 300 (step S17). Since the subsequent process is the same as that of the exemplary embodiment 1, a detailed description thereof will be omitted.

As described above, in the exemplary embodiment 2, similarly to the exemplary embodiment 1, a transmission process of a trigger packet is preferentially performed before a message recording process, so that delay until a message reaches the information processing terminal 300 becomes small.

Furthermore, if an estimation result of the RRC state is erroneous, the push server 500 may receive a message acquisition request from the information processing terminal 300 before the message recording process is performed. Even in such a case, the processing time limit termination time of the message recording process is changed, and the recording process of a message addressed to an information processing terminal having transmitted the message acquisition request is performed with the highest priority. Consequently, an effect is obtained in which a time until the push server 500 becomes able to transmit a message to the information processing terminal 300 is suppressed to be minimum although the RRC state of the information processing terminal 300 serving as a message transmission destination has been changed. The exemplary embodiment 2 is particularly preferable to the case in which a certain level of uncertainty is included in an acquired RRC state (for example, the case in which an information processing terminal in a pause state enters a communicable state).

Exemplary Embodiment 3

Subsequently, an exemplary embodiment 3 obtained by modifying a part of the exemplary embodiment 1 will be described.

In the exemplary embodiment 2, the case in which there is uncertainty in the estimation of the RRC state and a push server receives a message acquisition request from an information processing terminal before a preset recording processing time limit termination time of a message has been described. That is, the case of solving the first problem described in the beginning of the description of the exemplary embodiment 2 has been described. On the other hand, an object to the exemplary embodiment 3 is to solve the second problem described in the beginning of the description of the exemplary embodiment 2. That is, in the exemplary embodiment 3, the case in which a push server has not received a message acquisition request from an information processing terminal regardless of the passage of a preset recording processing time limit termination time of a message will be described.

Such an event occurs when a message recording process time limit has been set by regarding the RRC state of an information processing terminal as a communicable state, but the RRC state of the information processing terminal has actually been a pause state. In this case, although there is actually a spare time until a push server receives a message acquisition request from the information processing terminal, a processing time limit termination time of a message recording process passes. Therefore, an unnecessarily high priority is allocated to the message recording process. In this way, although there is a spare time, the message recording process is unnecessarily preferentially performed, so that another message recording process is postponed. In the exemplary embodiment 3, such a problem is solved.

Figure 11:
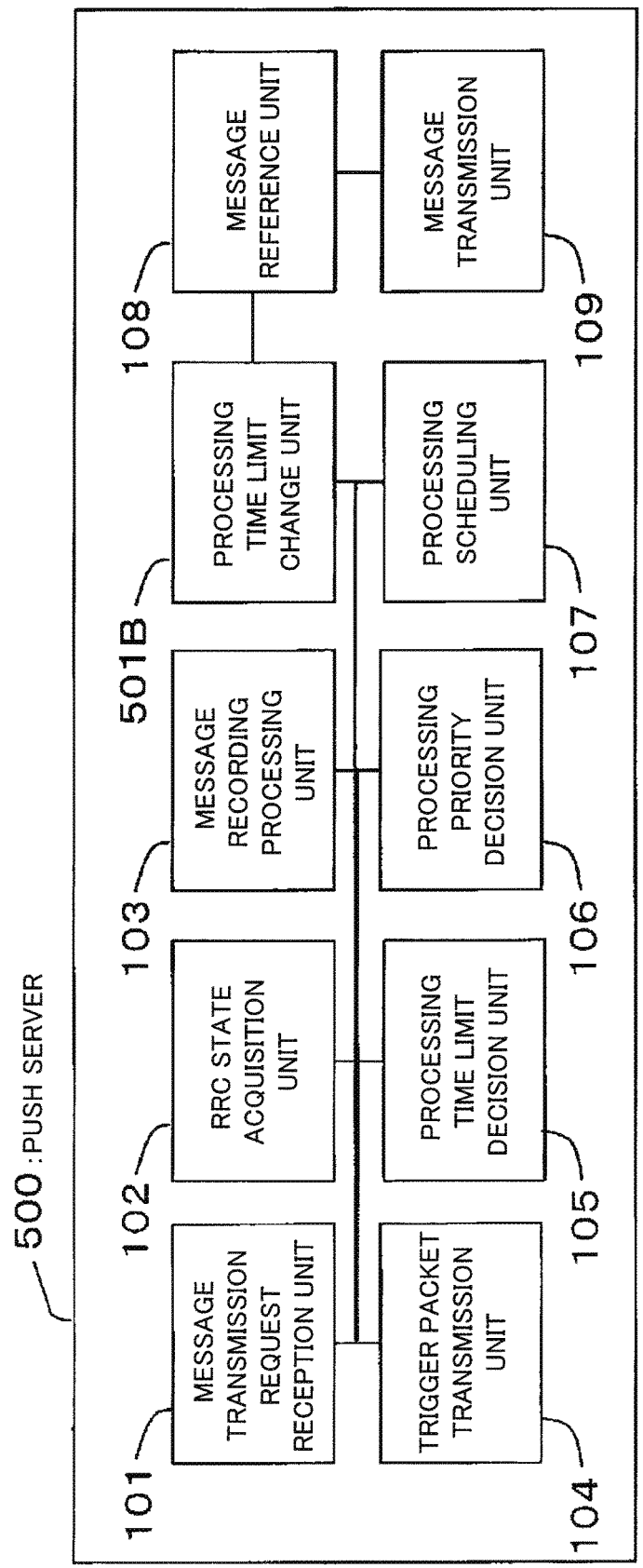
FIG. 11 is a block diagram illustrating a configuration example of a push server in the exemplary embodiment 3 of the present invention.

A configuration in the exemplary embodiment 3 illustrated in FIG. 11 is similar to the configuration in the exemplary embodiment 2, but the processing time limit change unit 501 is changed to a processing time limit change unit 501B.

In the exemplary embodiment 3, a processing time limit change method performed by the processing time limit change unit 501B of the push server 500 is different from the processing time limit change method performed by the processing time limit change unit 501 of the push server 500 of the exemplary embodiment 2. Therefore, also in the following description, only the processing time limit change method performed by the processing time limit change unit 501B will be described.

FIG. 12 is a flowchart illustrating a processing flow of the processing time limit change unit 501B of the push server 500 in the exemplary embodiment 3.

The processing time limit change unit 501B of the push server 500 checks a processing time limit of a message recording process not completely processed. In addition, the processing time limit change unit 501B checks whether a message acquisition request is received for a message corresponding to the message recording process not completely processed (step S41).

The processing time limit change unit 501B checks whether there exists a message recording process having satisfied two conditions that the message recording process is a message recording process in which a current time passes a processing time limit termination time and no message acquisition request is received for a message corresponding to the message recording process (step S42).

These two conditions will be described. As described above, when the processing time limit termination time of a message has passed, the priority is set to 10 which is a maximum value. Therefore, the message is to be processed with the highest priority. However, for example, when great many messages are concentrated on the push server 500 and a load is applied thereto, there may exist a case in which processing of a plurality of messages with the priority of 10 are delayed. As described above, the messages with the priority of 10 are delayed, so that processing of messages with a priority of 9 or less is not performed. Accordingly, when such a load is applied, it is preferable to change a processing time limit of a message recording process so as to be processed later with respect to a message needed not to be processed early among the messages with the priority of 10. In this way, other messages with the priority of 10 and the messages with the priority of 9 or less are processed early.

To this end, a message recording processing time limit has been set by regarding the RRC state of an information processing terminal as a communicable state, but it is preferable to postpone a message recording process of a message for which the RRC state of the information processing terminal has been actually a pause state.

In this regard, the non-reception of a message acquisition request is also employed as a condition. The non-reception of the message acquisition request indicates that the RRC state of the information processing terminal is presumed to be the pause state. On the other hand, the reception of the message acquisition request indicates that the RRC state of the information processing terminal is presumed to be the communicable state. Therefore, in step S42, two of the non-reception of the message acquisition request and the fact that the current time passes the processing time limit termination time are employed as conditions.

When there is even one message recording process satisfying the two conditions of step S42 (Yes in step S42), the processing time limit change unit 501B changes a processing time limit for all message recording processes satisfying the two conditions (step S43).

Herein, the processing time limit termination time is set by adding the "processing time limit corresponding to the RRC state of the information processing terminal 300" to the "trigger packet transmission time" as described above, but the processing time limit corresponding to the RRC state is set as a processing time limit of the pause state again.

That is, in the present operation example, when the RRC state of the information processing terminal has been regarded as the communicable state, the processing time limit change unit 501B sets the "processing time limit termination time" to be equal to the "transmission time of a trigger packet+100 milliseconds". Furthermore, the processing time limit change unit 501B newly changes this into the "processing time limit termination time=the transmission time of the trigger packet+3 seconds" in step S43. Then, the procedure proceeds to step S44. In addition, the present operation example has described the case in which the processing time limit corresponding to the RRC state is set as a value of the pause state again, but this may also be set as another value. For example, this may also be set again as another value exceeding a value of the communicable state and smaller than the value of the pause state. For example, this may also be changed to be the "processing time limit termination time=the transmission time of the trigger packet+2 seconds".

On the other hand, in step S42, when there is no message recording process in which the current time passes the processing time limit termination time (No in step S42), the process of step S43 is not performed and the procedure is directly transitioned to step S44.

In step S44, the procedure is stopped for a constant time period. The time period for which the procedure is stopped may be set in advance, and for example, is set to 10 milliseconds. Then, the procedure returns to step S41 and the similar process is repeated again.

In addition, the following is the reason by which the procedure is stopped. Even when the determinations of step S41 and step S42 have been continuously performed at a high speed in a state in which a constant time has not passed, it is less probable that a "message recording process not completely processed newly exists although the processing time limit termination time passes the current time". Therefore, the procedure becomes complicated. In this regard, a constant time period is waited in step S44. In this way, since it becomes highly probable to a certain degree that the "message recording process not completely processed newly exists although the processing time limit termination time passes the current time", the determinations of step S41 and step S42 are performed again. In other words, this indicates that step S41 to step S44 are regularly repeated at a cycle of a constant time.

Since a message transmission process in the exemplary embodiment 3 is similar to that of the exemplary embodiment 2, a description thereof will be omitted.

As described above, in the exemplary embodiment 3, when there is uncertainty in the RRC state of the information processing terminal 300, a high priority is prevented from being unnecessarily set in a recording process of a message. In this way, an effect is obtained in which it is possible to advance an execution time of another transmission process of a trigger packet and another recording process of a message which should be processed, so that delay until a message reaches the information processing terminal 300 is reduced. The exemplary embodiment 3 is particularly preferable to the case in which a certain level of uncertainty is included in an acquired RRC state and an information processing terminal in a pause state has been erroneously determined to be in a communicable state.

Furthermore, the aforementioned each exemplary embodiment is a preferable exemplary embodiment of the present invention. However, the scope of the present invention is limited only to the aforementioned exemplary embodiments and various modifications can be made without departing from the scope of the present invention.

For example, in step S42 of the aforementioned exemplary embodiment 3, since a message acquisition request has already reached, a processing time limit of a message recording process to be quickly performed is not extended. That is, in addition to the fact that the processing time limit termination time of a message to be determined in step S42 has been ended, the fact that a message acquisition request of the message to be determined has reached is also considered as a condition.

Actually, the exemplary embodiment 2 and the exemplary embodiment 3 are combined with each other, so that it is possible to omit check of the presence or absence of reach of the message acquisition request in step S42.

In detail, the exemplary embodiment 2 and the exemplary embodiment 3 are combined with each other, so that the specific procedure of the exemplary embodiment 3 illustrated in FIG. 12 is also performed while performing the procedure of the exemplary embodiment 2. In this way, it is possible to prevent the situation, in which the processing time limit of the message recording process to be quickly performed is extended because the message acquisition request has already reached, according to the following reason.

When the exemplary embodiment 2 and the exemplary embodiment 3 have been combined with each other, a message, which has been determined to be in a pause state but has actually been in a communicable state, is to be processed in the exemplary embodiment 2, so that it is possible to quickly end a message recording process.

On the other hand, it is considered that a message, other than a message not processed in the exemplary embodiment 2 and a message for which a message recording process has been ended before a message acquisition request is made, has been determined to be in a communicable state but has actually been in a pause state. For such a message, a processing time limit is set again to a processing time limit of a pause state by the procedure of the exemplary embodiment 3. That is, the exemplary embodiment 2 and the exemplary embodiment 3 are combined with each other, so that it is possible to cope with both the case in which a message has been determined to be in a pause state but has actually been in a communicable state and the case in which a message has been determined to be in a communicable state but has actually been in a pause state.

In addition, each of the aforementioned push server, message database, information processing terminal, and app server can be realized by hardware, software, or a combination thereof. Furthermore, a message transmission method performed by cooperation of the aforementioned push server, message database, information processing terminal, and app server can also be realized by hardware, software, or a combination thereof. Herein, the realization by the software indicates the realization by reading and execution of a program by a computer.

The program can be stored using various types of non-transitory computer readable mediums, and can be supplied to a computer. The non-transitory computer readable medium includes various types of tangible storage mediums. An example of the non-transitory computer readable medium includes a magnetic recording medium (for example, a flexible disk, a magnetic tape, a hard disk drive), a magneto-optical recording medium (for example, a magneto-optical disk), a CD-ROM (Read Only Memory), a CD-R, a CD-R/W, a semiconductor memory (for example, a mask ROM, a PROM (Programmable ROM), an EEPROM (Erasable ROM), a flash ROM, a RAM (random access memory). Furthermore, the program may also be supplied to the computer by various types of transitory computer readable mediums. An example of the transitory computer readable medium includes an electrical signal, an optical signal, and an electromagnetic wave. The transitory computer readable medium can supply the program to the computer via a wired communication path such as an electric wire and an optical fiber or a wireless communication path.

A part or the whole of the aforementioned exemplary embodiments is also written as with the following supplemental notes, but is not limited thereto.

(Supplemental note 1) A message transmission apparatus that performs a process regarding message transmission to a terminal, including a notification means configured to perform a notification process for transmitting a trigger packet indicating the presence of the message not transmitted to the terminal, a preparation means configured to perform a preparation process for transmitting the message to the terminal, and an order decision means configured to decide an execution order of the notification process and the preparation process such that the preparation process is ended before a message acquisition request is received from the terminal as a response for the trigger packet.

(Supplemental note 2) The message transmission apparatus according to Supplemental note 1, wherein based on whether the terminal is in a communicable state or a pause state, the execution order is decided such that the preparation process for a terminal in the communicable state is preferentially performed before the preparation process for a terminal in the pause state.

(Supplemental note 3) The message transmission apparatus according to Supplemental note 1 or 2, wherein the execution order is decided such that the notification process is preferentially performed before at least a part of the preparation process.

(Supplemental note 4) The message transmission apparatus according to any one of Supplemental notes 1 to 3, wherein based on whether the terminal is in the communicable state or the pause state, a processing time limit of a first length is set in the preparation process for a terminal in the communicable state, a processing time limit of a second length longer than the first length is set in the preparation process for a terminal in the pause state, and the execution order is decided such that a preparation process having a short time up to a termination time of the processing time limit is preferentially performed.

(Supplemental note 5) The message transmission apparatus according to Supplemental note 4, wherein a priority increasing as approaching to the termination time of the processing time limit is set in the preparation process, an unchanged priority with a constant level is set in the notification process, and the execution order is decided such that one with a high priority of the preparation process and the notification process is preferentially performed.

(Supplemental note 6) The message transmission apparatus according to Supplemental note 4 or 5, wherein although a termination time of a processing time limit of the preparation process for a certain message has passed, when the preparation process is not still performed and the message acquisition request for the certain message is not received from the terminal, the processing time limit of the preparation process is changed to a longer processing time limit.

(Supplemental note 7) The message transmission apparatus according to any one of Supplemental notes 1 to 6, wherein although the message acquisition request for the certain message has been received from the terminal, when the preparation process is not still performed for the certain message, the preparation process for the certain message is preferentially performed regardless of the decided execution order.

(Supplemental note 8) A message transmission method that performs a process regarding message transmission to a terminal, including the steps of performing a notification process for transmitting a trigger packet indicating the presence of the message not transmitted to the terminal, performing a preparation process for transmitting the message to the terminal, and deciding an execution order of the notification process and the preparation process such that the preparation process is ended before a message acquisition request is received from the terminal as a response for the trigger packet.

(Supplemental note 9) A message transmission program causing a computer to serve as a message transmission apparatus performing a process regarding message transmission to a terminal and including a notification means configured to perform a notification process for transmitting a trigger packet indicating the presence of the message not transmitted to the terminal, a preparation means configured to perform a preparation process for transmitting the message to the terminal, and an order decision means configured to decide an execution order of the notification process and the preparation process such that the preparation process is ended before a message acquisition request is received from the terminal as a response for the trigger packet.

(Supplemental note 10) A push type server that performs transmission of a message with respect to an information processing terminal, including an RRC state acquisition unit that acquires an RRC (Radio Resource Control) state of an information processing terminal to which a message is transmitted, a message recording processing unit that performs a process of allowing a message to be transmitted to the information processing terminal to be recorded in a recording device, a trigger transmission unit that transmits a trigger packet which informs the information processing terminal of the fact that an untransmitted message for the information processing terminal exists in a server, a processing time limit decision unit that decides a processing time limit of a process, in which the message recording processing unit records a message addressed to the information processing terminal, on the basis of the RRC state of the information processing terminal acquired by the RRC state acquisition unit, a processing priority decision unit that decides priorities of the message recording process, which is performed by the message recording processing unit, and the trigger transmission process, which is performed by the trigger transmission unit, on the basis of the processing time limit, a processing scheduling unit that decides a processing order of the message recording process, which is performed by the message recording processing unit, and the trigger transmission process, which is performed by the trigger transmission unit, on the basis of the processing priorities decided by the processing priority decision unit, and a message transmission unit that receives a message acquisition request transmitted by the information processing terminal having received the trigger packet, and transmits a message addressed to the information processing terminal as a response of the message acquisition request.

(Supplemental note 11) The server according to Supplemental note 10, wherein the processing priority decision unit sets the priority of the message recording process performed by the message recording processing unit to be low as a remaining time up to the processing time limit decided by the processing time limit decision unit is long.

(Supplemental note 12) The server according to Supplemental note 10 or 11, further including a processing time limit change unit that changes the processing time limit of the recording process of the message addressed to the information processing terminal when the recording process of the message addressed to the information processing terminal has not been completed by the message recording processing unit at the time point at which the message transmission unit has received the message acquisition request from the information processing terminal.

(Supplemental note 13) The server according to Supplemental note 10 or 11, further including a processing time limit change unit that changes the processing time limit of the message recording process when the processing time limit of the message recording process decided by the processing time limit decision unit passes and the message transmission unit does not receive the message acquisition request from the information processing terminal.

(Supplemental note 14) A message transmission method that performs transmission of a message with respect to an information processing terminal in a push type, including the steps of acquiring an RRC state of an information processing terminal to which a message is transmitted, performing a process of allowing a message to be transmitted to the information processing terminal to be recorded in a recording device, transmitting a trigger packet which informs the information processing terminal of the fact that an untransmitted message for the information processing terminal exists in a server, deciding a processing time limit of a process of recording a message addressed to the information processing terminal, on the basis of the acquired RRC state of the information processing terminal, deciding priorities of the message recording process and the trigger transmission process on the basis of the processing time limit, deciding a processing order of the message recording process, which is performed in the message recording step, and the trigger transmission process on the basis of the decided processing priorities, and receiving a message acquisition request transmitted by the information processing terminal having received the trigger packet and transmitting a message addressed to the information processing terminal as a response of the message acquisition request.

(Supplemental note 15) The message transmission method according to Supplemental note 14, wherein the priority of the message recording process is set to be low as a remaining time up to the processing time limit is large is long.

(Supplemental note 16) The message transmission method according to Supplemental note 14 or 15, wherein the processing time limit of the recording process of the message addressed to the information processing terminal is changed when the recording process of the message addressed to the information processing terminal has not been completed at the time point at which the message acquisition request has been received from the information processing terminal.

(Supplemental note 17) The message transmission method according to Supplemental note 14 or 15, wherein the processing time limit of the message recording process is changed when the decided processing time limit of the message recording process passes and the message acquisition request is not received from the information processing terminal.

(Supplemental note 18) A program causing a computer that performs transmission of a message with respect to an information processing terminal in a push type to execute an RRC state acquisition process of acquiring an RRC state of an information processing terminal to which a message is transmitted, a message recording process of allowing a message to be transmitted to the information processing terminal to be recorded in a recording device, a trigger transmission process of transmitting a trigger packet which informs the information processing terminal of the fact that an untransmitted message for the information processing terminal exists in a server, a processing time limit decision process of deciding a processing time limit of a process of recording a message addressed to the information processing terminal in the message recording process, on the basis of the acquired RRC state of the information processing terminal acquired in the RRC state acquisition process, a processing priority decision process of deciding priorities of the message recording process performed in the message recording process and the trigger transmission process performed in the trigger transmission process, on the basis of the processing time limit, a processing scheduling process of deciding a processing order of the message recording process and the trigger transmission process on the basis of the processing priorities decided in the processing priority decision process, and a message transmission process of receiving a message acquisition request transmitted by the information processing terminal having received the trigger packet and transmitting a message addressed to the information processing terminal as a response of the message acquisition request.

(Supplemental note 19) The program according to Supplemental note 18, wherein in the processing priority decision process, the priority of the message recording process is set to be low as a remaining time up to the processing time limit decided in the processing time limit decision process is long.

(Supplemental note 20) The program according to Supplemental note 18 or 19, wherein a processing time limit change process of changing the processing time limit of the recording process of the message addressed to the information processing terminal is further performed when the message recording process addressed to the information processing terminal has not been completed at the time point at which a message acquisition request has been received from the information processing terminal in the message transmission process.

(Supplemental note 21) The program according to Supplemental note 18 or 19, wherein a processing time limit change process of changing the processing time limit of the message recording process is further performed when the processing time limit of the message recording process decided in the processing time limit decision process passes and the message acquisition request is not received from the information processing terminal in the message transmission process.

This application is based upon and claims the benefit of priority from Japanese Patent Application No. 2013-022389, filed on Feb. 7, 2013, the disclosure of which is incorporated herein in its entirety by reference.

INDUSTRIAL APPLICABILITY

The present invention is preferable for preventing delay in distribution of a push message.

REFERENCE SIGNS LIST

100, 100-1 to **100-*n*, 500, 500-1 to 500-*n*, 1100** push server
101 message transmission request reception unit
102 RRC state acquisition unit
103 message recording processing unit
104 trigger packet transmission unit
105 processing time limit decision unit
106 processing priority decision unit
107 processing scheduling unit
108 message reference unit
109 message transmission unit
200, 1200 message database
300, 300-1 to **300-*m*** information processing terminal
310, 1002 push client
311 trigger packet reception unit
312 message reception unit
313 message notification unit
320-1 to **320-*k*, 1001** app
400, 400-1 to **400-*j*, 1300** app server
501, 501B processing time limit change unit

What is claimed is:

1. A message transmission apparatus that performs a process regarding message transmission to a terminal, comprising:

a notification unit configured to perform a notification process for transmitting a trigger packet indicating presence of the message not transmitted to the terminal;

a preparation unit configured to perform a preparation process for transmitting the message to the terminal; and an order decision unit configured to decide an execution order of the notification process and the preparation process in such a way that the preparation process is ended before a message acquisition request is received from the terminal as a response to the trigger packet.

2. The message transmission apparatus according to claim 1, wherein based on whether the terminal is in a communicable state or a pause state, the execution order is decided in such a way that the preparation process for a terminal in the communicable state is preferentially performed before the preparation process for a terminal in the pause state.

3. The message transmission apparatus according to claim 2, wherein the execution order is decided such that the notification process is preferentially performed before at least a part of the preparation process.

4. The message transmission apparatus according to claim 2, wherein based on whether the terminal is in the communicable state or the pause state, a processing time limit of a first length is set in the preparation process for a terminal in the communicable state, a processing time limit of a second length longer than the first length is set in the preparation process for a terminal in the pause state, and the execution order is decided in such a way that a preparation process having a short time up to a termination time of the processing time limit is preferentially performed.

5. The message transmission apparatus according to claim 2, wherein although the message acquisition request for the certain message has been received from the terminal, when the preparation process is not still performed for the certain message, the preparation process for the certain message is preferentially performed regardless of the decided execution order.

6. The message transmission apparatus according to claim 1, wherein the execution order is decided in such a way that the notification process is preferentially performed before at least a part of the preparation process.

7. The message transmission apparatus according to claim 6, wherein based on whether the terminal is in the communicable state or the pause state, a processing time limit of a first length is set in the preparation process for a terminal in the communicable state, a processing time limit of a second length longer than the first length is set in the preparation process for a terminal in the pause state, and the execution order is decided in such a way that a preparation process having a short time up to a termination time of the processing time limit is preferentially performed.

8. The message transmission apparatus according to claim 6, wherein although the message acquisition request for the certain message has been received from the terminal, when the preparation process is not still performed for the certain message, the preparation process for the certain message is preferentially performed regardless of the decided execution order.

9. The message transmission apparatus according to claim 1, wherein based on whether the terminal is in the communicable state or the pause state, a processing time limit of a first length is set in the preparation process for a terminal in the communicable state, a processing time limit of a second length longer than the first length is set in the preparation process for a terminal in the pause state, and the execution order is decided in such a way that a preparation process having a short time up to a termination time of the processing time limit is preferentially performed.

10. The message transmission apparatus according to claim 9, wherein a priority increasing as approaching to the termination time of the processing time limit is set in the preparation process, an unchanged priority with a constant level is set in the notification process, and the execution order is decided in such a way that one with a high priority of the preparation process and the notification process is preferentially performed.

11. The message transmission apparatus according to claim 10, wherein although a termination time of a processing time limit of the preparation process for a certain message has passed, when the preparation process is not still performed and the message acquisition request for the certain message is not received from the terminal, the processing time limit of the preparation process is changed to a longer processing time limit.

12. The message transmission apparatus according to claim 9, wherein although a termination time of a processing time limit of the preparation process for a certain message has passed, when the preparation process is not still performed and the message acquisition request for the certain message is not received from the terminal, the processing time limit of the preparation process is changed to a longer processing time limit.

13. The message transmission apparatus according to claim 9, wherein although the message acquisition request for the certain message has been received from the terminal, when the preparation process is not still performed for the certain message, the preparation process for the certain message is preferentially performed regardless of the decided execution order.

14. The message transmission apparatus according to claim 1, wherein although the message acquisition request for the certain message has been received from the terminal, when the preparation process is not still performed for the certain message, the preparation process for the certain message is preferentially performed regardless of the decided execution order.

15. A message transmission method that performs a process regarding message transmission to a terminal, comprising:

performing a notification process for transmitting a trigger packet indicating presence of the message not transmitted to the terminal, performing a preparation process for transmitting the message to the terminal; and deciding an execution order of the notification process and the preparation process in such a way that the preparation process is ended before a message acquisition request is received from the terminal as a response to the trigger packet.

16. A non-transitory computer-readable medium storing message transmission program causing a computer to function as a message transmission apparatus performing a process regarding message transmission to a terminal, the process comprising performing a notification process for transmitting a trigger packet indicating presence of the message not transmitted to the terminal;

performing a preparation process for transmitting the message to the terminal; and deciding an execution order of the notification process and the preparation process in such a way that the preparation process is ended before a message acquisition request is received from the terminal as a response to the trigger packet.

* * * * *